(12) United States Patent
Moritz et al.

(10) Patent No.: US 12,518,156 B2
(45) Date of Patent: Jan. 6, 2026

(54) TRAINING A NEURAL NETWORK USING GRAPH-BASED TEMPORAL CLASSIFICATION

(71) Applicant: Mitsubishi Electric Research Laboratories, Inc., Cambridge, MA (US)

(72) Inventors: Niko Moritz, Cambridge, MA (US); Takaaki Hori, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1200 days.

(21) Appl. No.: 17/235,074

(22) Filed: Apr. 20, 2021

(65) Prior Publication Data

US 2022/0129749 A1     Apr. 28, 2022

Related U.S. Application Data

(60) Provisional application No. 63/104,627, filed on Oct. 23, 2020.

(51) Int. Cl.
G06N 3/08      (2023.01)
G06N 3/04      (2023.01)

(52) U.S. Cl.
CPC ............... G06N 3/08 (2013.01); G06N 3/04 (2013.01)

(58) Field of Classification Search
CPC ............ G06N 3/08; G06N 3/04; G06N 3/045; G06N 3/082; G06N 7/01; G06N 3/084
See application file for complete search history.

(56) References Cited

U.S. PATENT DOCUMENTS 9,368,106 B2 *   6/2016   Sidi ..................... G10L 15/04
9,613,624 B1 *   4/2017   Kramer ................ G10L 15/08
(Continued)

OTHER PUBLICATIONS

Battenberg, Eric, et al. "Exploring neural transducers for end-to-end speech recognition." 2017 IEEE automatic speech recognition and understanding workshop (ASRU). IEEE, 2017. https://ieeexplore.ieee.org/stamp/stamp.jsp?tp=&arnumber=8268937 (Year: 2017).*

(Continued)

Primary Examiner — Kakali Chaki
Assistant Examiner — Michael H Hoang
(74) Attorney, Agent, or Firm — Gene Vinokur

(57) ABSTRACT

A method for training a neural network with a graph-based temporal classification (GTC) objective function, using a directed graph of nodes connected by edges representing labels and transitions among the labels, is provided. The directed graph specifies one or a combination of non-monotonic alignment between a sequence of labels and a sequence of probability distributions and constraints on the label repetitions. The method comprises executing a neural network to transform a sequence of observations into the sequence of probability distributions, and updating parameters of the neural network based on the GTC objective function configured to maximize a sum of conditional probabilities of all possible sequences of labels that are generated by unfolding the directed graph to the length of the sequence of observations and mapping each unfolded sequence of nodes and edges to a possible sequence of labels.

20 Claims, 21 Drawing Sheets

(56) References Cited

U.S. PATENT DOCUMENTS 10,714,076 B2 * 7/2020 Menendez-Pidal .......................... G10L 15/144
2018/0330718 A1 * 11/2018 Hori .......................... G06N 3/08

OTHER PUBLICATIONS

Doetsch, Patrick. Alignment models for recurrent neural networks. Diss. Dissertation, RWTH Aachen University, 2020, 2020. https://publications.rwth-aachen.de/record/805289/files/805289.pdf (Year: 2020).*

Walker, Shane, et al. "Semi-supervised model training for unbounded conversational speech recognition." arXiv preprint arXiv: 1705.09724 (2017). https://arxiv.org/pdf/1705.09724 (Year: 2017).*

Inaguma, Hirofumi, Masato Mimura, and Tatsuya Kawahara. "CTC-synchronous training for monotonic attention model." arXiv preprint arXiv:2005.04712 (2020). https://arxiv.org/pdf/2005.04712 (Year: 2020).*

Li, Sheng, Yuya Akita, and Tatsuya Kawahara. "Semi-supervised acoustic model training by discriminative data selection from multiple asr systems' hypotheses." IEEE/ACM Transactions on Audio, Speech, and Language Processing 24.9 (2016): 1524-1534. (Year: 2016).*

[Item U continued] https://www.researchgate.net/publication/301829151_Semi-Supervised_Acoustic_Model_Training_by_Discriminative_Data_Selection_From_Multiple_ASR_Systems'_Hypotheses.*

Shi, Ruibo, Raymond WM Ng, and Pawel Swietojanski. "Teacher-student training for acoustic event detection using audioset." ICASSP 2019-2019 IEEE International Conference on Acoustics, Speech and Signal Processing (ICASSP). IEEE, 2019. https://ieeexplore.ieee.org/stamp/stamp.jsp?tp=&arnumber=8683048 (Year: 2019).*

Petridis, Stavros, et al. "Audio-Visual Speech Recognition With a Hybrid CTC/Attention Architecture." arXiv preprint arXiv: 1810.00108 (2018). https://arxiv.org/pdf/1810.00108 (Year: 2018).*

Zhang, Yu, William Chan, and Navdeep Jaitly. "Very Deep Convolutional Networks for End-to-End Speech Recognition." arXiv preprint arXiv:1610.03022 (2016). https://arxiv.org/pdf/1610.03022 (Year: 2016).*

* cited by examiner

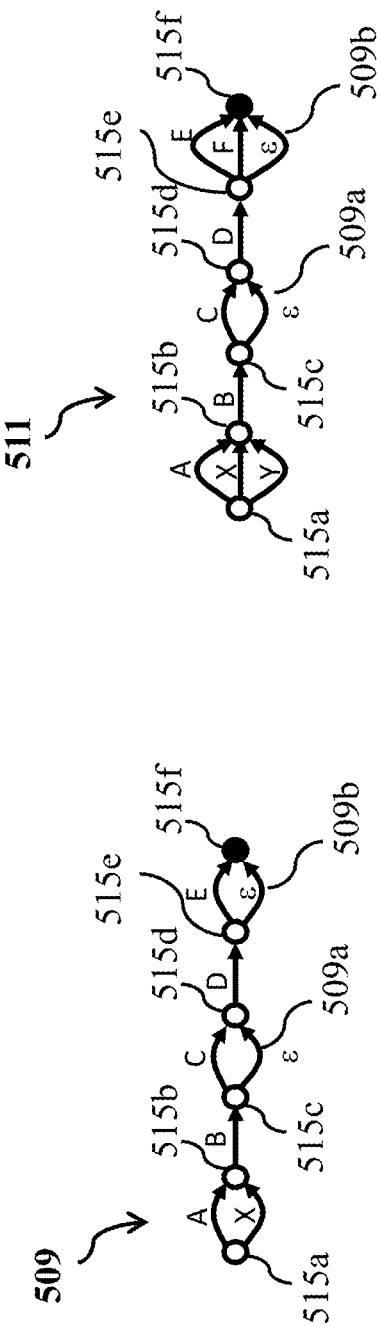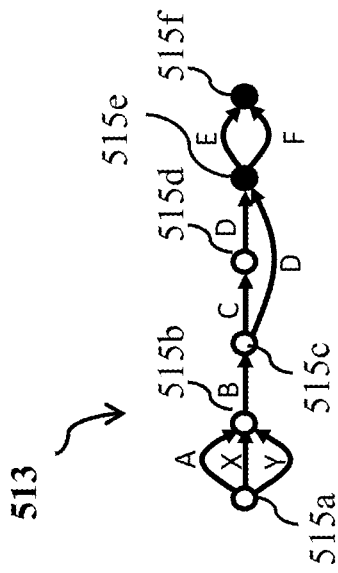
FIG. 5B
FIG. 5C
FIG. 5D

| data set | 1-best | 10-best | 20-best | $CN^{20}$ | $CN^{20}_{low}$ | $CN^{20}_{high}$ |
|---|---|---|---|---|---|---|
| clean 360h | 11.3 | 9.0 | 8.7 | 8.3 | 8.6 | 8.9 |
| other 500h | 18.3 | 15.7 | 15.3 | 14.5 | 14.8 | 15.3 |

Table 1

FIG. 8B

Table 2

| pseudo-labels | W | pruning | dev clean | dev other | test clean | test other |
|---|---|---|---|---|---|---|
| N/A | | | 7.8 | 20.0 | 8.3 | 21.2 |
| 1-best | 1.0 | no | 5.9 | 15.2 | 6.1 | 15.8 |
| $CN^{20}$ | 1.0 | no | 5.8 | 14.7 | 6.0 | 15.5 |
| $CN^{20}$ | $p$ | low | 5.7 | 14.7 | 5.9 | 15.1 |
| $CN^{20}$ | $p$ | high | 5.6 | 14.2 | 5.9 | 15.0 |
| oracle 20-best | | | 5.2 | 13.9 | 5.5 | 14.5 |
| ground-truth | | | 3.2 | 8.3 | 3.5 | 8.4 |

FIG. 8C

TRAINING A NEURAL NETWORK USING GRAPH-BASED TEMPORAL CLASSIFICATION

TECHNICAL FIELD

This invention generally relates to training neural networks and more specifically to a method of training the neural network using a graph-based temporal classification (GTC) objective.

BACKGROUND

Neural networks can reproduce and model nonlinear processes due to which, over the last decades, neural networks have been used in numerous applications of various disciplines. Neural networks can be learn (or are trained) by processing examples, each of which contains a known "input" and "result," forming probability-weighted associations between the two, which are stored within the data structure of the net itself. The training of a neural network from a given example is usually conducted by determining the difference between the processed output of the network (often a prediction) and a target output also referred to herein as a training label. This difference represents the error that the training aims to reduce. Hence, the network then adjusts its weighted associations according to a learning rule and using this error value. Successive adjustments will cause the neural network to produce output that is increasingly similar to the target output. After a sufficient number of these adjustments, the training can be terminated based upon certain criteria.

This type of training is usually referred to as supervised learning. During supervised learning, the neural networks "learn" to perform tasks by considering examples, generally without being programmed with task-specific rules. For example, in image recognition, they might learn to identify images that contain cats by analyzing example images that have been labeled as "cat" or "no cat" and using the results to identify cats in other images. They do this without any prior knowledge of cats, for example, that they have fur, tails, whiskers, and cat-like faces. Instead, they automatically generate identifying characteristics from the examples that they process.

However, to perform such supervised learning, the images need to be labeled as cats or dogs. Such labeling is a tedious and laborious process. Also, in this image recognition example, the labeling is unambiguous. The images contain either cat, dog, or not cats or dogs. Such unambiguous labeling is not always possible. For example, some training applications tackle sequence problems where the timing is a variable. The time variable may create one-to-many or many-to-one ambiguity in such training where a sequence of inputs has a different length than a sequence of outputs.

Specifically, some methods of training neural networks use a connectionist temporal classification (CTC) objective function algorithm. The CTC is a loss function that is used to train the neural network when there is no temporal alignment information available between a sequence of training labels and a longer sequence of label probabilities outputted by the neural networks, which is computed from a sequence of observations inputted to the neural networks. Such missing temporal alignment information creates a temporal ambiguity between the sequence of label probabilities outputted by the neural networks and the supervision information for the training, which is the sequence of training labels that can be resolved using the CTC objective function.

However, the CTC objective function is suitable only to resolve the temporal ambiguity during the training of neural networks. The CTC objective function would fail if other types of ambiguities need to be considered.

SUMMARY

Some embodiments are based on the realization that principles of the CTC objective function are well suited for some situations but are unsuitable for others. Specifically, the CTC objective function is using an additional blank label that is inserted before and after each training label in the sequence of training labels used for the training. Also, the CTC allows infinite label repetitions and uses specific rules to transition from one label to another. By following the CTC rules, a label sequence including the blank labels can be expanded to a length of an observation sequence. Such an expansion allows considering the time alignment during the training. There are multiple ways how a sequence of labels can be expanded to the length of an observation sequence using the CTC rules. However, all these ways would work only for the alignment of a specific sequence of labels in time but would fail in other situations.

However, some embodiments are based on a recognition that the complexities of the modern applications are not limited to only temporal alignment addressing the time ambiguity. For example, in some situations the definition of the training label itself is ambiguous, and hence the training needs to resolve not only the time but also the label ambiguity. For example, label ambiguity can arise when the training labels are produced in an automated manner. Indeed, when the training label is produced manually by a human operator, the label can be made precise, accurate and can be considered as a ground truth. However, when the label is produced in an automated manner, as in, e.g., semi-supervised learning, the accuracy of the label is uncertain. Besides, even during the labeling by a human operator, the labeling process can be so laborious that sometimes is performed only partially, as in e.g., weakly label situation, thereby creating the label ambiguity. Additionally or alternatively, a human operator may also be unsure about one or more particular labels within a sequence of labels, and use wildcard labels or sets of potential labels instead of a single one for each label they are unsure of.

To that end, it is an object of some embodiments to transform the principles of the CTC objective to provide a different training objective function suitable not only for the time alignment but also for the label alignment and/or other purposes.

Some embodiments are based on the recognition that the rules of the CTC objective enforce a monotonic alignment between the sequence of label probabilities outputted by a neural network and the sequence of labels and thus prevent the label alignment. This should not come as a surprise because the monotonic alignment corresponds to the resolution of the one-dimensional ambiguity, i.e., the ambiguity in the time domain. Further, the specific CTC rules for inserting blank labels and for transitioning from one label in the sequence of labels to another can be represented as a graph. The CTC does not consider graphs, but if it would, for CTC such a graph would be a directed graph that fixes the order at which the labels can be visited such that only a monotonic alignment between the sequence of label probabilities outputted by a neural network and the sequence of labels is allowed. While the definition of the CTC objective and/or the CTC rules is not graph-based, some embodiments are based on the realization that the problem or limitation of the CTC objective can be illustrated by a directed graph and be solved using a graph-based definition.

Specifically, if the CTC rules make the supervisory information of the training label sequence reside on a directed graph that enforces a monotonic alignment between the sequence of label probabilities generated by a neural network and the sequence of training labels, some embodiments change this limitation by using supervisory information for the training with a directed graph breaking the monotonic alignment rules. While the directed graph with monotonic alignment rules allows variations only in the time dimension, the non-monotonic feature of the directed graph allows variations in both the time and the label dimensions to consider different sequences of labels during the training. Hence, the training objective would not be a CTC anymore and is referred to herein as a graph-based temporal classification (GTC) objective.

To that end, some embodiments disclose training a neural network with a GTC objective using supervisory information residing on a non-monotonic directed graph that has non-monotonic alignment properties. The non-monotonic alignment properties can be explained with respect to the monotonic alignment properties. The monotonicity or the monotonic alignment property of the graph is defined by the number of label sequences that can be generated from the graph by transitioning from a specific start node to a specific end node after removing label repetitions and the blank labels.

As defined herein, a graph with monotonic alignment properties, such as a graph that would follow the CTC rules, could only output a single label sequence, whereas a graph with non-monotonic alignment properties could output multiple different label sequences. As also defined herein, and as commonly understood by the skilled artisans, label sequences having the same order of labels arranged differently in time or having different padding with blank labels are considered the same label sequences and treated by this disclosure as the single label sequence. For example, as defined by the CTC, the padded label sequences after the collapsing process that removes the repetition of the duplicated labels and then the blank labels produce a single sequence of labels, which is the training label sequence input to the CTC objective. In the GTC setting with non-monotonic alignment, such a collapsing can and/or would produce multiple sequences of labels.

To that end, in some embodiments, the structure of the directed graph with non-monotonic alignment allows multiple unique label sequences mapping the sequence of labels with the sequence of probability distributions. To achieve such non-monotonic alignment, the structure of nodes and edges forming the directed graph include one or a combination of multiple non-blank connections, in which at least one node in the directed graph is connected by the edges to multiple other nodes representing different non-blank labels, and a loop formed by edges connecting multiple non-blank nodes.

Some embodiments are based on a realization that presenting the supervisory information on a directed graph allows applying different rules for training the neural networks in a manner consistent with principles of such training. This is because the structure of the directed graph is consistent with the differentiable approach used by the forward-backward algorithm of the training. Thus, if a rule desired to be imposed on the training is represented as part of the structure of the directed graph, such a rule can be imposed on the training in a differentiable manner consistent with the forward-backward algorithm.

An example of such a rule is a constraint on label repetitions. Specifically, in the CTC objective, to unfold the training label sequence to the length of the sequence of observations, a label can be repeated as many times as allowed by the difference between the length of the training sequence of labels and the length of the sequence of observations. However, such an unconstrained repetition requirement can waste computational resources. Without having the directed graph, it is challenging to impose the repetition constraint on the training. However, with the help of the directed graph, the repetition constraint can be incorporated into the structure of the directed graph itself.

Hence, additionally or alternatively to the non-monotonic alignment of the directed graph, some embodiments use the structure of the directed graph to impose a constraint on label repetitions during the training specifying a minimum number of repetitions of a label, a maximum number of repetitions of the label, or both. Such a constraint on label repetition of a node representing a label can be achieved by removing a self-transition of the node and add to the node the transition to other nodes representing the same label.

Hence, having the supervisory information from a directed graph of nodes connected by edges representing labels and transitions among the labels allows imposing flexible rules for training the neural networks. For example, some embodiments disclose training a neural network with a GTC objective without inserting a blank label between all the training labels or with using multiple different blank labels. Additionally or alternatively, some embodiments disclose training a neural network with a GTC objective using a hidden Markov model (HMM) like topology for each of the labels, which can include multiple states. Additionally or alternatively, some embodiments disclose training a neural network with a GTC objective using a directed graph with transitions between nodes associated with a cost or a weighting factor.

In addition to using the supervisory information residing on the directed graph, some embodiments modified the GTC objective function to accommodate label alignment. For example, the GTC objective function is defined by maximizing the sum of the conditional probabilities of all node sequence paths with a particular start node and end node that can be generated from a given directed graph by unfolding the graph to the length of the sequence of label probabilities outputted by the neural network. The GTC training loss and the gradients can efficiently be computed by a dynamic programming algorithm that is based on computing forward and backward variables and stitching both together.

The GTC-based training of the neural network aims to update the trainable parameters of the neural network by optimizing the label predictions of the neural network such that the best overall predicted sequences of labels can be generated by the directed graph encoding the labeling information and minimizing the error of all possible label sequence predictions for a set of training sample and graph-based labeling information pairs. Examples of the trainable parameters include weights of neurons of the neural network, hyperparameters, and the like.

Additionally or alternatively, some embodiments are based on the realization that the GTC objective function and the directed graph allow considering not only multiple sequences of labels but also different probabilities for the multiple sequences of labels. Such a consideration is advantageous for the GTC objective function because this consideration can adapt the supervisory information for the specific situation. To that end, in some embodiments, the directed graph is weighted with different weights for at least some edges or transitions. The weight of these transitions is used in the computation of the conditional probabilities of the sequence of labels.

Accordingly, one embodiment discloses a computer-implemented method of training a neural network by using a graph-based temporal classification (GTC) objective function using supervisory information from a directed graph of nodes connected by edges representing labels and transitions among the labels, wherein the directed graph represents possible alignment paths for a sequence of probability distributions outputted by a neural network and the labels, wherein a structure of the directed graph specifies one or combination of a non-monotonic alignment between a sequence of labels and the sequence of probability distributions, and a constraint on label repetitions in the sequence of labels, wherein an input to the neural network is a sequence of observations and an output of the neural network is the sequence of probability distributions over all labels in a set of labels.

The method comprising: executing the neural network to transform the sequence of observations into the sequence of probability distributions; and updating parameters of the neural network based on the GTC objective function configured to maximize a sum of conditional probabilities of all possible sequences of labels that are generated by unfolding the directed graph to the length of the sequence of probability distributions and mapping each unfolded sequence of nodes and edges to a sequence of labels, wherein the sum of the conditional probabilities of all sequences of labels is estimated from the sequence of probability distributions determined by the neural network and the weights residing on the edge of the directed graph.

BRIEF DESCRIPTION OF THE DRAWINGS

FIG. 5B illustrates the confusion network generated based on alignment between three sequences of labels, in accordance with an example embodiment.

FIG. 5C illustrates the confusion network generated based on alignment between three sequences of labels, in accordance with an example embodiment.

FIG. 5D illustrates a confusion network optimized by the epsilon removal operation, in accordance with an example embodiment.

FIG. 8B shows Table 1 that illustrates the oracle label error rates (LERs) for N-best lists of different sizes N as well as for CNs that are generated from the 20-best ASR hypotheses for each utterance, in accordance with an example embodiment.

FIG. 8C shows Table 2 that illustrates GTC-based ASR results for different pseudo-label representations, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
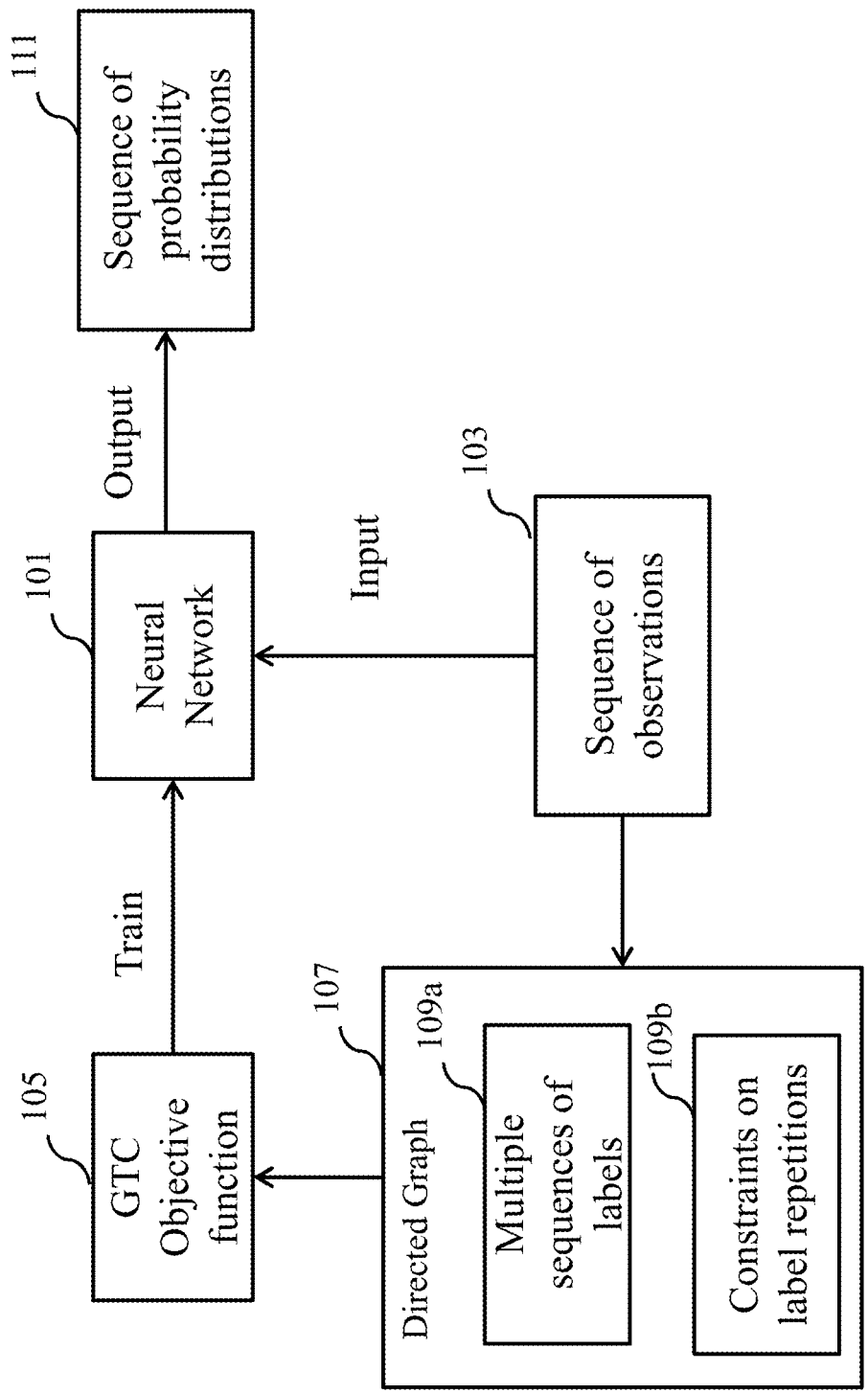
FIG. 1A is a schematic diagram illustrating a workflow of training a neural network using a graph-based temporal classification (GTC) objective function, in accordance with an example embodiment.

FIG. 1A is a schematic diagram illustrating a workflow of training a neural network 101 using a graph-based temporal classification (GTC) objective function 105, in accordance with an example embodiment. The neural network 101 is trained to output a sequence of probability distributions 111 for a sequence of observations 103, where the sequence of probability distributions 111 denotes the label probabilities at each instance of time. The type of the sequence of observations 103 inputted to the neural network 101 and the multiple sequences of labels 109a depend on the type of application in which the neural network 101 is being used.

For example, for the neural network 101 associated with an ASR system, the sequences of observations 103 provided at an input interface of the neural network 101 are associated with speech utterances and the multiple sequences of label 109a may correspond to words, sub-words, and/or characters from the alphabet of a particular language. Further, in an acoustic event detection application, where the neural network 101 may be trained to detect different acoustic events that occurred in a specific span of time in an acoustic scene, the sequence of observations 103 may comprise different audio features of sounds comprised in the specific span of time in the acoustic scene. In this case, the multiple sequences of labels 109a may comprise labels corresponding to different entities producing the sound or causing the acoustic event. For example, for meowing sound in the acoustic scene—a label "cat sound" may be used, similarly, for barking sound—a label "dog sound" may be used. Thus, the sequence of observations 103 and the multiple sequences of labels 109a vary depending on the application.

The neural network 101 is trained using the GTC objective function 105, where the GTC objective function 105 uses supervisory information from a directed graph 107. The directed graph 107 comprises a plurality of nodes connected by edges, where the edges represent labels and transitions among the labels. Some embodiments are based on a realization that presenting the supervisory information on a directed graph 107 allows applying different rules for training the neural networks in a manner consistent with principles of such training. This is because the structure of the directed graph 107 is consistent with the differentiable approach used by the forward-backward algorithms of the training. Thus, if a rule desired to be imposed on the training is represented as part of the structure of the directed graph 107, such a rule can be imposed on the training in a differentiable manner consistent with the forward-backward algorithms.

For example, in one embodiment, the directed graph 107 represents multiple possible alignment paths for the sequence of probability distributions 111 and the multiple sequences of labels 109a. Such a directed graph allows using the GTC objective to train the neural network 101 to perform the alignment between its input and outputs in both the time and label domain. To achieve this multi-alignment, a structure of the directed graph 107 is non-monotonic, i.e., specifies a non-monotonic alignment between a sequence of labels of the multiple sequences of labels 109a and the sequence of probability distributions 111.

Additionally or alternatively, in one embodiment, the directed graph 107 represents a constraint 109b on label repetitions. The constraint 109b on label repetition specifies a minimum number of repetitions of a label, a maximum number of repetitions of the label, or both. The constraint 109b on label repetition can reduce the number of possible sequences of labels that can be generated during the unfolding of the directed graph 107 for the time alignment and speed up the computation of GTC loss.

The sequence of observations 103 may correspond to features extracted by a feature extraction method. For example, the observations may be obtained by dividing the input signal into overlapping chunks and extracting features from each of the chunks. The type of extracted features may vary depending on the type of input. For example, for the speech utterances, features extracted from a chunked sequence of audio samples may comprise a spectral decomposition of the input signal and additional signal processing steps to mimic the frequency resolution of the human ear. For example, each feature frame extracted from the input speech utterance may correspond to a time instance in the sequence of observations 103, e.g., where each frame of the speech utterance is associated with 25 milliseconds of audio samples shifted 10 milliseconds further in time from the previous frame of the speech utterance. Each feature frame of the speech utterance in the sequence of feature frames of the speech utterance may include acoustic information that characterizes the portion of the utterance at the corresponding time step. For example, the sequence of feature frames of audio data may include filter bank spectral energy vectors.

Inputs and Outputs of the Neural Network

In various embodiments, an input to the neural network 101 is a sequence of observations 103 and an output of the neural network 101 is the sequence of probability distributions 111 over a set of labels. For clarity of explanation, the probability distribution 111 generated by the neural network 101 is explained below using an exemplary embodiment, where the neural network 101 is trained for automatic speech recognition (ASR). However, this example is not intended to limit the scope, applicability, or configuration of embodiments of the present disclosure.

Figure 1B:
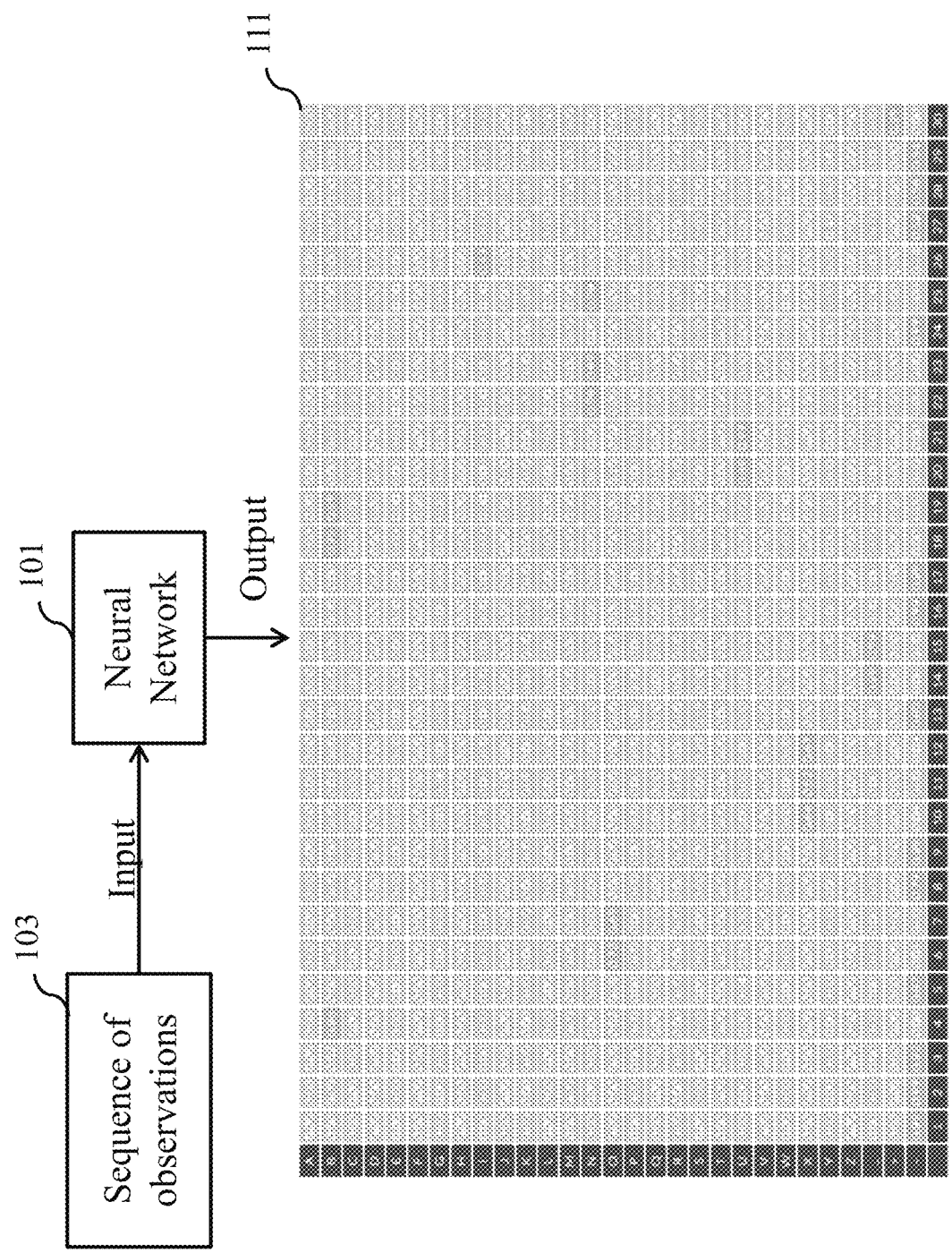
FIG. 1B illustrates the sequence of probability distribution outputted by a neural network, in accordance with an example embodiment.

FIG. 1B illustrates the sequence of probability distribution 111 computed from the multiple sequences of observations 103 by the neural network 101 trained for ASR in accordance with an example embodiment. FIG. 1B is explained in conjunction with FIG. 1A. The input to the neural network 101 includes a sequence of observations 103 with features extracted from a speech utterance. The neural network 101 is trained based on supervisory information including the directed graph 107 encoding possible speech recognitions having some ambiguities.

The directed graph 107 and the sequence of probability distributions 111 are processed by the GTC objective function 105 to optimize the temporal and label alignment of labels in the directed graph 107 for an input sequence of observation and to determine the gradients for updating the parameters of the neural network 101. The neural network 101, trained using the GTC objective function 105, produces a matrix of the sequence of probabilities 111, where columns correspond to timesteps and each row corresponds to a label (here a letter in the English alphabet).

In the example of FIG. 1B, the neural network 101 outputs a D×T dimensional matrix (where D denotes the label dimension and T the time dimension, where D=29 and T=30 in the given example) or sequence of probability distributions 111, where letters of the English alphabet and some special characters correspond to the D=29 labels. Each column (D-dimension) in the D×T matrix corresponds to probabilities that sum to one, i.e., the matrix denotes a probability distribution over all labels for each timestep. In this example, the labels correspond to characters of the English alphabet from A-Z plus the extra symbols "_", ">", and "-", where "-" denotes a blank token or a blank symbol. The sequence of probability distributions 111 defines probabilities of different labels for each time step, which is computed from the sequence of observations 103 by the neural network 101. For example, as observed in FIG. 1B, the probability at the fourth time step to observe a label "B" is 96%, the probability of the label "O" is 3% and the probability of the remaining labels is close to zero. Hence, the most likely sequences of labels in the outputs of this example would have either the letter "B" or "O" at the fourth time position. At inference time, the final sequence of labels may be extracted from the sequence of probability distributions 111 over the labels using various techniques such as prefix beam search.

Further, by using the GTC objective the neural network 101 is trained to maximize the probability of the sequences of labels, in the sequence of probability distributions 111, corresponding to a sequence of nodes and edges that are comprised by the directed graph 107. For example, assume that the ground-truth transcription of input speech utterance corresponds to "BUGS_BUNNY", however, the ground-truth transcription is unknown. In such a case, the directed graph 107 may be generated from a list of ASR hypotheses for the speech utterance corresponding to "BUGS_BUNNY". For example, the list of ASR hypotheses represented by the directed graph 107 may be "BOX_BUNNY", "BUGS_BUNNI", "BOG_BUNNY", etc. (here each letter of the English alphabet corresponds to a label). Since it is unknown if any of the hypotheses is correct or what parts of a hypothesis are correct, such a list of multiple hypotheses for the speech utterance corresponding to "BUGS_BUNNY" contains ambiguous label information unlike the ground truth information of just "BUGS_BUNNY."

During GTC training the directed graph 107 will be unfolded to the length of the sequence of probability distributions 111, where each path from a specific start node to a specific end node in the unfolded graph denotes an alignment path and label sequence. Such a graph can comprise a non-monotonic alignment between the sequence of probability distributions 111 outputted by the neural network 101 and the sequences of labels 109 encoded in the graph. One of the alignment paths comprised by the directed graph 107 may correspond to the sequence of labels: "-BOOXXX_B-BUUN-NI", "B-OOX-_-BUNN-NY-", "BU-GS-_-BUN-N-Y-", and the likes (where "-" denotes a blank symbol). Each sequence of labels in the directed graph 107 comprises temporal alignment and label alignment. The temporal and label alignment of the labels in the directed graph 107 and the sequence of probability distributions 111 is optimized by the GTC objective function 105 by processing the directed graph 107 and training the neural network 101. The GTC objective function 105 is used to train the neural network 101 to maximize the probability of sequences of labels that are comprised by the directed graph 107. Transition weights residing on the edges of the directional graph 107 may be used during training to emphasize more likely alignment paths. To that end, in an example embodiment, each hypothesis may be provided with a score by the neural network 101. Further, each hypothesis may be ranked based on the score. Further, based on the ranking, weights may be assigned to transitions corresponding to each hypothesis such that weights of transitions corresponding to the first ranked hypothesis are more than weights of transition corresponding to the subsequent hypothesis of the N-best hypotheses. For example, a hypothesis "BOG" may have a higher rank compared to another hypothesis "BOX", based on contextual information. Hence, the weight connecting the labels "O" and "G" may be greater than the weight of the connections between "O" and "X". Accordingly, a sequence of labels with higher transition weights will be assigned with a higher probability score and thus, are selected to correctly transcribe the input speech utterances.

The Directed Graph with Non-Monotonic Alignment

In some embodiments, the supervisory information is comprised by the structure of the directed graph 107, where the supervisory information is used by the GTC objective function 105 to resolve one or more ambiguities such as temporal and label ambiguities to train the neural network 101. Thus, the supervisory information specifies one or a combination of a non-monotonic alignment between the multiple sequences of labels 109a and the sequence of probability distributions 111. Based on the non-monotonic alignment the directed graph 107 can output multiple unique label sequences.

Figure 1C:
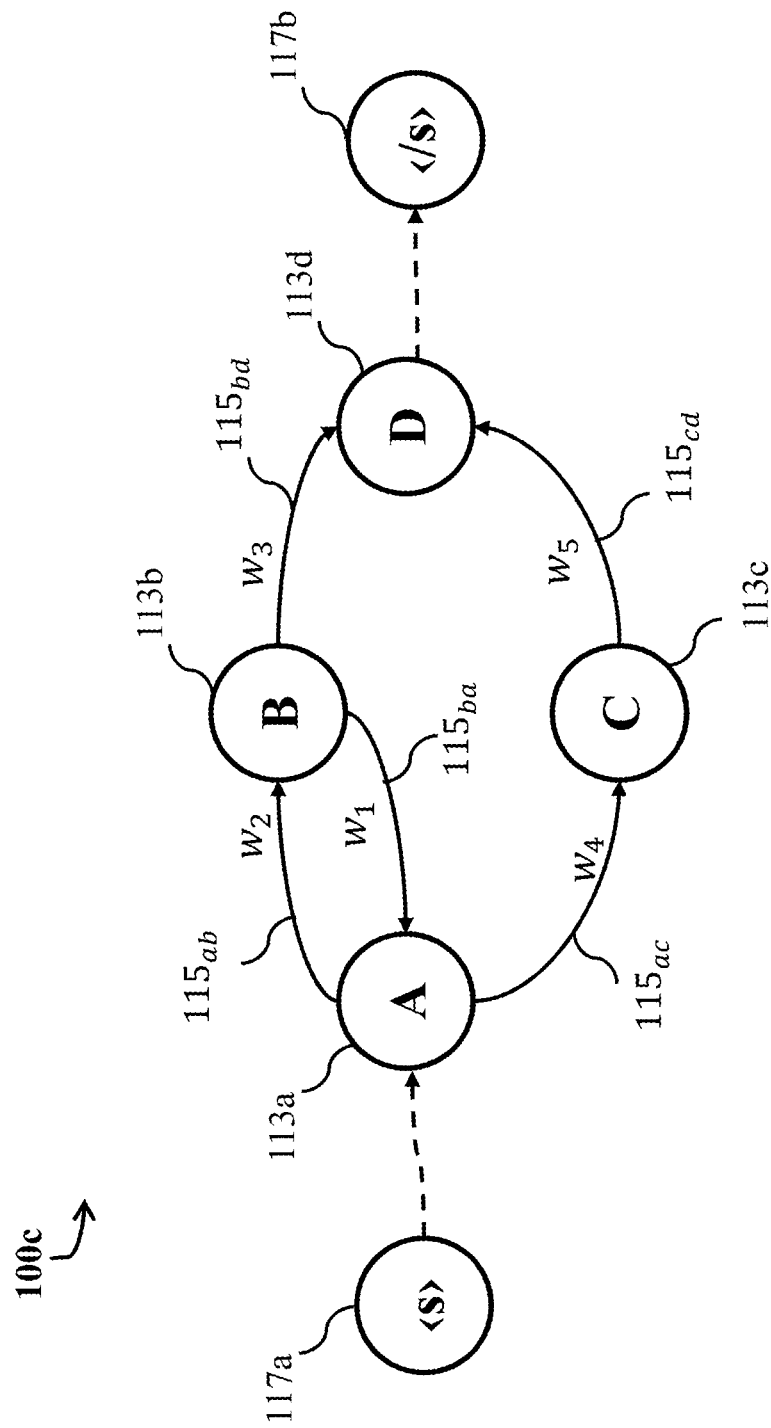
FIG. 1C illustrates an exemplary non-monotonic directed graph in accordance with an example embodiment.

FIG. 1C illustrates an exemplary directed graph 100c in accordance with an example embodiment. The directed graph 100c includes multiple nodes 113a, 113b, 113c, and 113d where each node represents a label. For example, node 113a represents a label "A", 113b represents a label "B", node 113c represents a label "C", and node 113d represents a label "D". The directed graph 100c starts with a start node 117a and ends with an end node 117b. In the FIG. 1C, the start, and the end nodes are connected to the labels with dashed lines to illustrate that there could be other nodes in the directed graph 100c not shown for the simplicity and clarity of illustration.

The directed graph 100c is a non-monotonic directed graph thereby providing a non-monotonic alignment between a sequence of labels of the directed graph 100c and the sequence of probability distributions 111 outputted by the neural network 101 during the training. In different embodiments, the non-monotonic alignment can be implemented differently to enable multiple paths through the nodes of the directed graph 100c capturing the label and time ambiguities.

For example, as illustrated in FIG. 1C, the non-monotonic alignment in the directed graph 100c can be structured by connecting at least one node to different nodes representing different labels. For example, node 113a representing a label A is connected by an edge 115ab to a node 113b representing a label B, and also connected by an edge 115ac to a node 113c representing a label C. Such a split connection allows creating multiple different sequences of labels defined by multiple different paths through the graph, such as a sequence ABD and a sequence ACD sandwiched between the start node and the end node.

Another example of non-monotonic alignment encoded in the structure of the directed graph 100c is a loop formed by edges connecting multiple non-blank nodes. In the directed graph 100c, the loop is formed by edges 115ab and 115ba allowing making multiple paths through the graph, such as ABACD or ABABD.

Some embodiments are based on the realization that because the non-monotonic directed graph 100c encodes different sequences of labels, not all sequences are equally probable. Hence, there is a need to impose unequal probability on the structure of the directed graph 100c.

An additional advantage of the directed graph 100c is its ability to encode the probability of transitions, as weights of the edges, which in turn encodes the probability of different paths. To that end, at least some edges, in the non-monotonic directed graph 100c, are associated with different weights (w), making the directed graph 100c a weighted directed graph 100c. For example, an edge 115ab may be weighted with weight $w_2$, an edge 115ba may be weighted with weight $w_1$, an edge 115bd may be weighted with weight $w_3$, an edge 115ac may be weighted with weight $w_4$, and an edge 115cd may be weighted with weight $w_5$. Further, based on the weights, conditional probabilities of sequences of nodes may be varied. For example, if the weight $w_2$ is greater than the weight $w_1$, then in a specific sequence of nodes conditional probability of transition from node 113a to node 113b is more than the conditional probability of transition from node 113b to node 113a.

The Directed Graph with a Constraint on Label Repetition

Figure 1D:
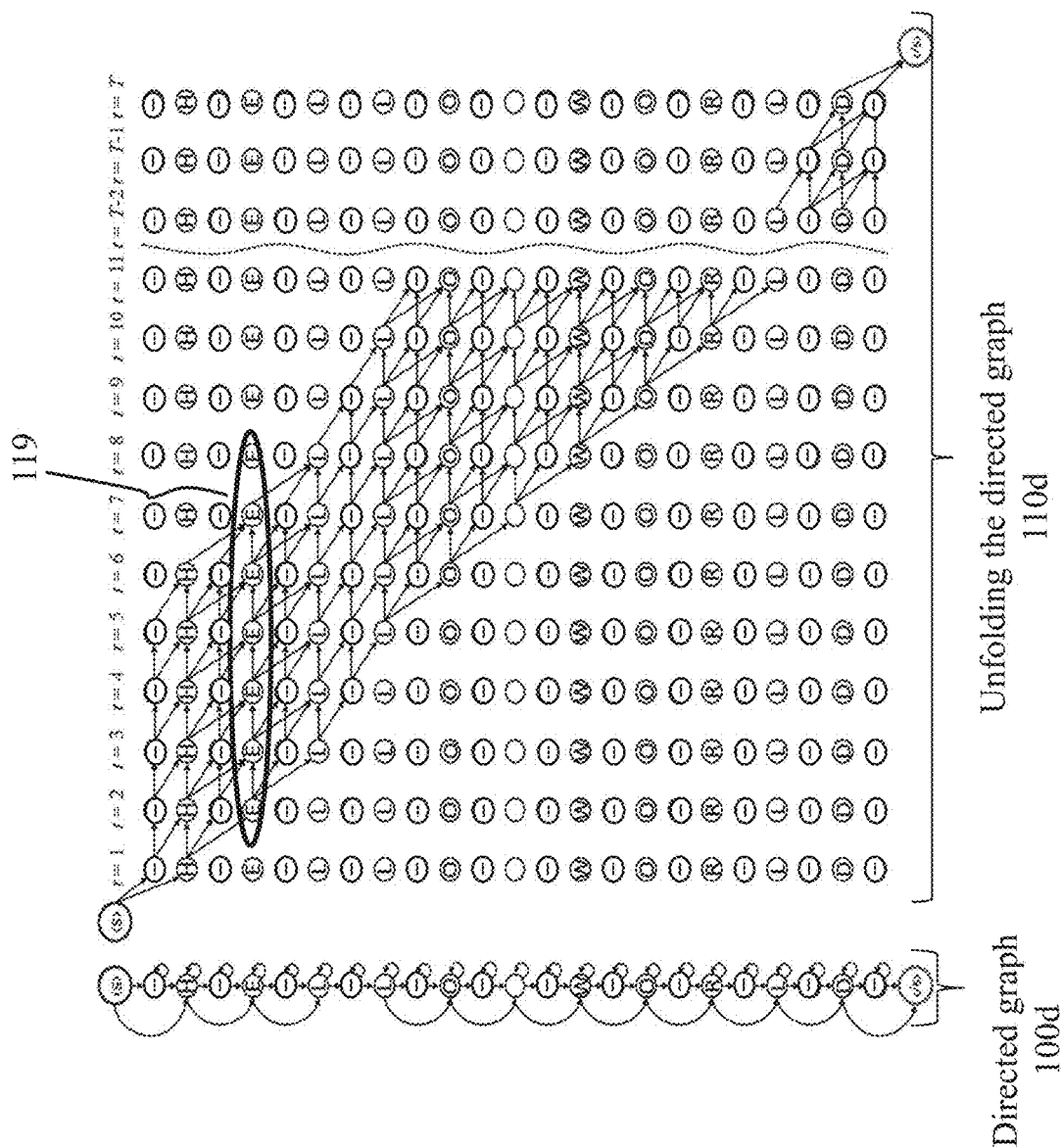
FIG. 1D illustrates an example of possible unconstraint repetition of a label during the unfolding of a directed graph, in accordance with an example embodiment.

FIG. 1D illustrates the repetitions of a label during the unfolding of a directed graph 100d, in accordance with an example embodiment. FIG. 1D comprises a directed graph 100d on the left side with the unfolded directed graph 110d on the right side. The directed graph 100d comprises a sequence of labels corresponding to a transcription "HELLO WORLD". Suppose there are more observations in a sequence of observations 103 provided to a neural network 101 than labels in a sequence of labels, i.e. transcription. For example, the number of letters in the transcription "HELLO WORLD" is 10 and the number of observations (and corresponding conditional probabilities) may be 30. Therefore, in order to match or align the number of labels to the number of observations, some labels in the transcriptions are repeated during the unfolding of the graph. For example, the letter "E" in the transcription "HELLO WORLD" may be repeated several times.

However, due to the lack of constraints on the number of times a label can be repeated causes unnecessary wastage of computation power as the GTC objective function is required to analyze possible transitions from each of the repeated labels. To that end, the directed graph 100d comprises constraints 109b on label repetitions. The constraints 109b in the directed graph 100d may comprise a minimum number of times a label is allowed to repeat in a sequence of labels or a maximum number of times a label is allowed to repeat in a sequence of labels, or both. This is because it is unlikely to observe the letter "E" over so many consecutive time frames as in exemplar unfolding 119.

Hence, additionally or alternatively to the non-monotonic alignment of the directed graph 100d, some embodiments use the structure of the directed graph 100d to impose a constraint on label repetitions during the training specifying a minimum number of repetitions of a label, a maximum number of repetitions of the label, or both. Such a constraint on label repetition of a node representing a label can be achieved by removing a self-transition of the node and add to the node the transition to other nodes representing the same label.

Figure 1E:
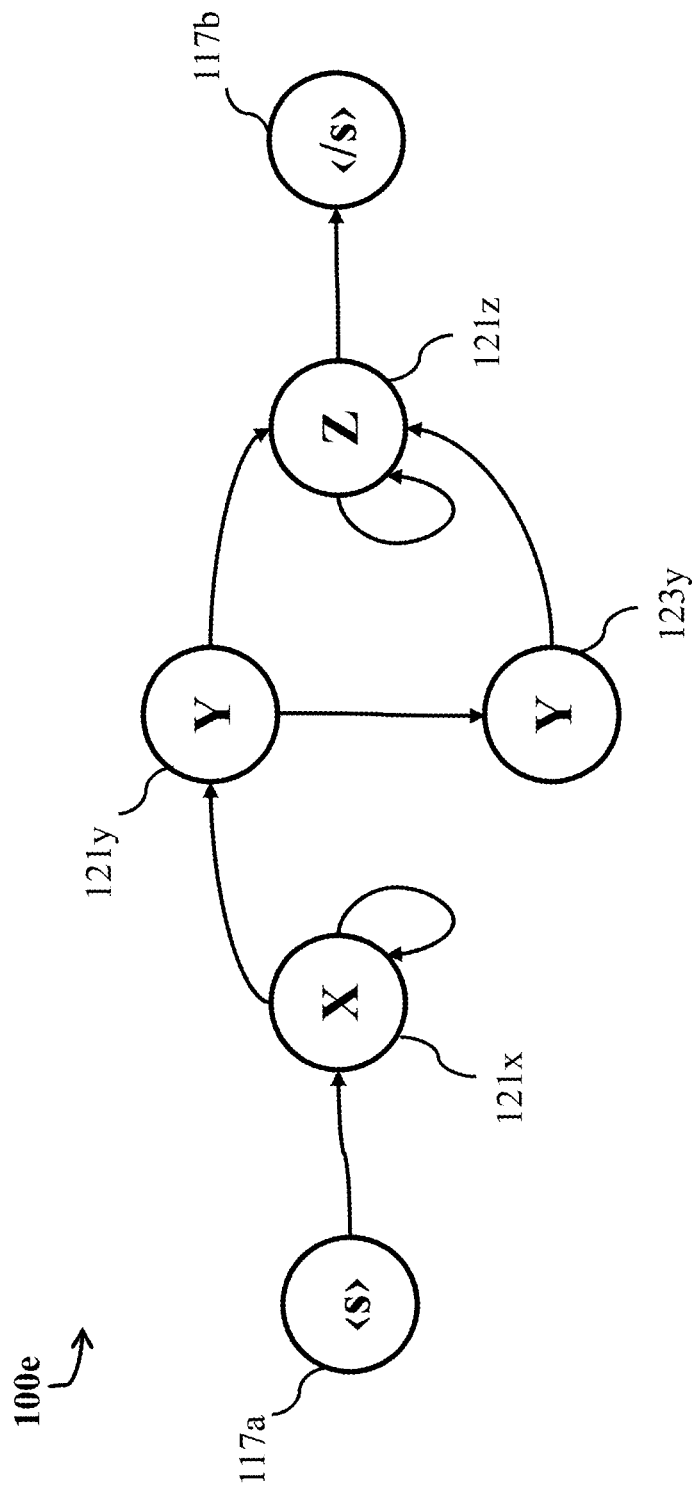
FIG. 1E illustrates an exemplary monotonic directed graph, in accordance with an example embodiment.

FIG. 1E illustrates an exemplary directed graph 100e with a constraint 109b on a label repetition, in accordance with an example embodiment. The directed graph 100e starts with a start node 117a and ends with an end node 117b. The monotonic directed graph 100e includes multiple nodes 121x, 121y, 123y, and 121z where each node represents a label. For example, node 121x represents a label "X", 121y represents a label "Y", node 121z represents a label "Z" and 123y represents another label "Y". In this example, a sequence of connected nodes representing the same label is formed by nodes 121y and 123y.

The directed graph 100e is monotonic because while there are multiple paths through the nodes of the graph connecting the start and the end node, after the collapsing procedure, only a single sequence of labels XYZ can be formed.

For example, the monotonic directed graph 100e graph may specify different sequences of labels such as X→X→X→Y→Z→Z→ or X→Y→Y→Z or X→Y→Z during the unfolding of the monotonic directed graph 100e. However, after collapsing these label sequences only one label sequence is generated which is X→Y→Z. In some embodiments, multiple monotonic directed graphs may be combined to form a non-monotonic directed graph (such as the non-monotonic directed graph 100c), which is used in training the neural network 101.

Further, in the monotonic directed graph 100e, it may be defined that a particular label, for example, label "Y", should not be repeated more than twice and that labels "X" and "Z" can be repeated for multiple numbers of times. This information is encoded in the structure of the graph and is used during the unfolding in an automatic manner. For example, nodes 121x and 121z have self-transitions, and thus can be repeated any number of times that are allowed by the unfolding. In contrast, nodes 121y and 123y corresponding to label "Y" do no have the self-transition. Hence, to travel through the graph between the start and the end node, the path could be 121x-121y-121z, in which label "Y" corresponding to the node 121y is repeated once or 121x-121y-123y-121z, in which label "Y" corresponding to the nodes 121y and 123y is repeated twice. Further, the directed graph 100e allows to modify or constrain repetition of other labels such as labels "X" and "Z" which are currently repeated multiple times without any constraints. The directed graph 100e may be modified to the directed graph 100f to put constraints on other labels "X" and "Z".

Figure 1F:
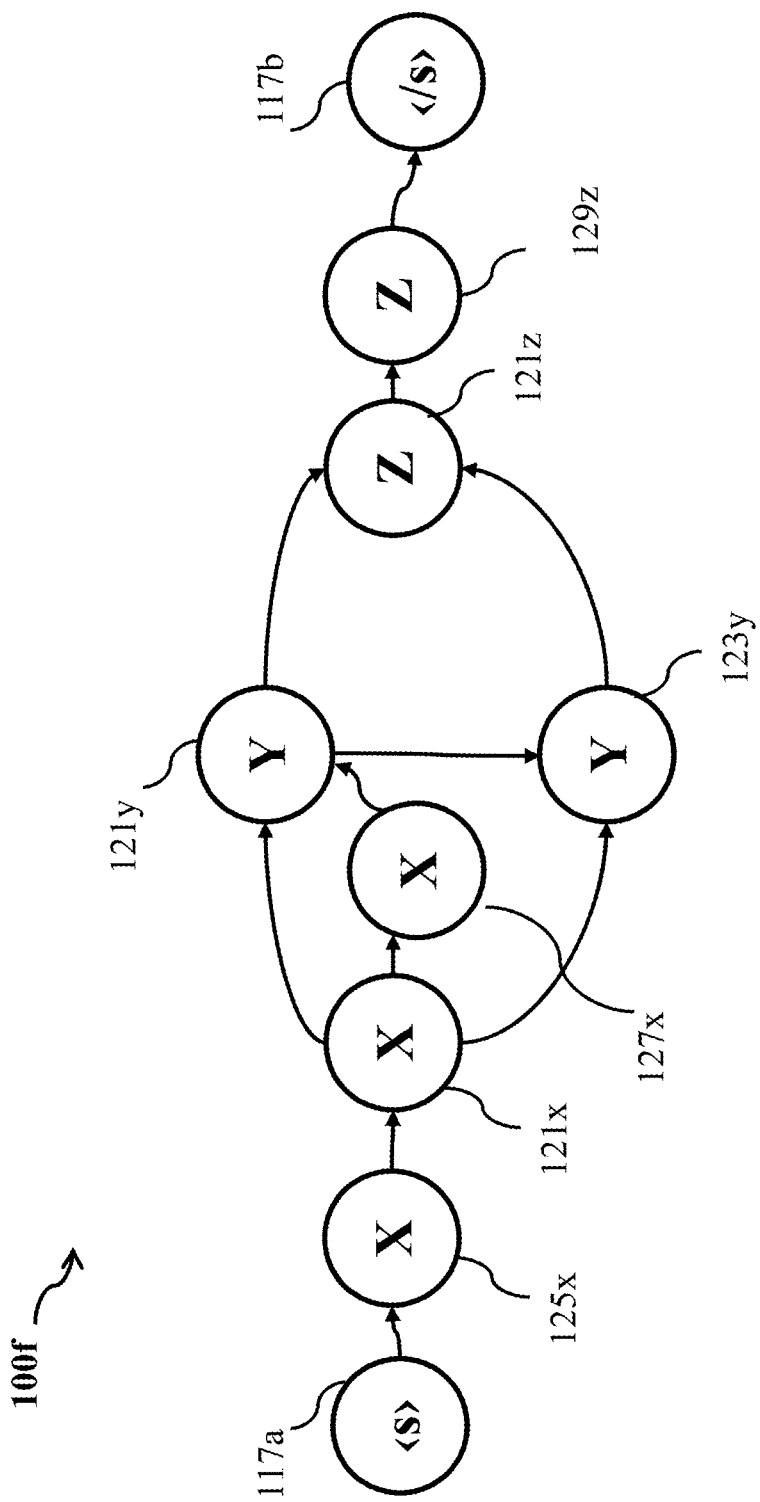
FIG. 1F illustrates a monotonic directed graph modified based on the constraints on label repetitions, in accordance with an example embodiment.

FIG. 1F illustrates another exemplary directed graph 100f with a constraint 109b on a label repetition, in accordance with an example embodiment. In FIG. 1F, the structure of the monotonic directed graph 100f constraints that label "X" can be repeated only thrice in a sequence to that end a node 125x representing label "X" and node 127x also representing label "X" may be connected to the original node 121x. In this example, a sequence of connected nodes representing the same label is formed by nodes 121x and 125x, and 127x.

In a similar manner, the label "Z" may be constrained to be always repeated twice, and so on. To that end, node 129z may be connected to the original node 121z. In this, way the directed graph 100f provides great flexibility to optimize the training of the neural network 101.

The constraint 109b on repetition is advantageous for speech-related applications. For example, for a directed graph 100f to be used by a neural network 101 corresponding to an ASR system configured to transcribe in English language, it may be known in advance that an output corresponding to label "U" is unlikely to be observed over multiple consecutive frames. Hence, label "U" may be constrained to be repeated only a limited number of times in order to reduce computational complexity and to speed up the computation of the GTC objective.

The advantage of the constraint 109b on repetition is not limited to speech-related applications. For example, a directed graph 100f and a neural network 101 can correspond to an acoustic event detection system implemented to detect acoustic events in a home environment. A short event like a "door slam" may not be likely to occur over many consecutive observation frames. Therefore, the structure of the directed graph 100f may define the constraint 109b on the repetition of the label "door slam".

Training with GTC Objective Using the Directed Graph

In various embodiments, the neural network 101 trained based on the GTC objective function 105 to transform the sequence of observations 103 into the sequence of probability distributions 111. Further, the neural network 101 is configured to unfold the directed graph 107 to generate all possible sequences of labels from the multiple sequences of labels 109a such that length of the sequence of labels matches the length of the sequence of probability distributions 111. Unfolding the directed graph 107 includes generating the sequence of labels and alignment paths according to the structure of the directed graph 107 by finding paths from a start node to an end node through the nodes and edges of the directed graph 107 of the length of the sequence of probability distributions 111. Each path in the unfolded graph corresponds to a sequence of nodes and edges of fixed length starting at a particular start node and ending at a particular end node. Each possible path in the unfolded graph corresponding to a sequence of nodes and edges can be mapped to a sequence of labels.

Further, the neural network 101 updates one or more parameters of the neural network 101 based on the GTC objective function 105 that is configured to maximize a sum of conditional probabilities of all the possible sequences of labels 109 generated by unfolding the directed graph 107. The one or more parameters of the neural network 101 updated by the neural network 101 may comprise the neural network weights and biases as well as other trainable parameters such as embedding vectors, and the likes.

In some embodiments, the directed graph 107 is a weighted graph with at least some edges associated with different weights. Further, the GTC objective function 105 is configured to learn a temporal alignment and a label alignment to obtain an optimal pseudo-label sequence from the weighted directed graph 107 such that the training of the neural network 101 using the GTC function 105 updates the neural network 101 to reduce a loss with respect to the optimal pseudo-label sequence. The neural network 101 trained using the GTC objective function 105 transforms the sequence of observations 103 into the sequence of probability distributions 111 over all possible labels at each instance of time. Further, the trained neural network 101 maximizes the probability of a sequence of labels, at the output of the neural network 101, that is corresponding to a sequence of nodes and edges present in the directed graph 107.

Thus, the proposed GTC objective function 105 makes it possible for the neural network 101 to learn and update parameters of the neural network 101 with label information in a graph format.

The directed graph 107 provides the supervisory information that is used by the GTC objective function 105 in training the neural network 101. In the directed graph 107, a sequence of labels is represented by multiple nodes and edges. Further, the directed graph 107 may comprise a non-monotonic alignment between the sequence of probability distributions d 111 and the multiple sequences of labels 109a represented by the directed graph 107. The non-monotonic alignment or monotonic alignment is defined as the number of label sequences that can be generated from the directed graph 107 by transitioning from a specific start node to a specific end node after removing label repetitions and the blank labels. The non-monotonic alignment allows the directed graph 107 to output multiple unique label sequences, while a monotonic graph would only allow to output a single label sequence.

Because of the non-monotonic alignment feature, the directed graph 107 comprises information associated not only with variation of sequences of labels in time domain but also with variation of the sequences of labels in label domain, itself. Due to the variation of the sequences of label in the label domain, the directed graph 107 comprises multiple paths through the multiple nodes and edges of the directed graph 107, where each path corresponds to at least one sequence of labels of the multiple sequences of labels 109a. Thus, each edge in the directed graph 107 has a direction from one node towards another.

Thus, the non-alignment feature allows the directed graph 107 to consider different sequences of labels during the training, which allows training of the neural network 101 with ambiguous label information in order to account for uncertainties about the correct transcription of a training sample.

Further, the directed graph 107 allows repetition of at least one label of the sequence of labels for the specific minimum number of times and the specific maximum number of times during unfolding of the directed graph 107 in order to reduce the number of possible label paths that can be generated from the unfolded graph and to speed up the computation of the GTC loss.

In some embodiments, the non-monotonic directed graph 107 is a weighted graph with at least some edges associated with different weights. Further, based on the weights of the corresponding edges in the directed graph 107, conditional probabilities of the sequence of nodes may be computed during training.

For ease of explanation, the GTC objective function is explained here with respect to a neural network corresponding to an ASR system. Consider a feature sequence X of length T' derived from a speech utterance, processed by the neural network 101 to output a posterior distribution sequence $Y=(y^1, \ldots, y^T)$ of length T potentially different from T' due to downsampling, where $y^t$ denotes the vector of posterior probabilities and $$y_k^t$$

the posterior probability for output symbol k at time t. For GTC, the label information for training is represented by the graph $\mathcal{G}$, where the graph $\mathcal{G}$ corresponds to the directed graph 107. The GTC objective function 105 marginalizes over all possible node sequences that can be obtained from graph $\mathcal{G}$, which includes all valid node patterns as well as all valid temporal alignment paths. Thus, the conditional probability for a given graph $\mathcal{G}$ is defined by the sum over all node sequences in $\mathcal{G}$, which can be written as:

$$p(\mathcal{G} \mid X) = \Sigma_{\pi \in S(\mathcal{G}, T)} p(\pi \mid X) \qquad (1)$$

where, $S$ represents a search function that unfolds $\mathcal{G}$ to all possible node sequences of length T (not counting non-emitting start and end nodes), $\pi$ denotes a single node sequence and alignment path, and $p(\pi|X)$ is the posterior probability for the path $\pi$ given feature sequence X. The posterior probability is used to compute conditional probability for the path $\pi$. The computation of the conditional probability is explained in detail later with respect to FIG. 3.

Let's introduce a few more notations that will be useful to derive $p(\mathcal{G} \mid X)$. The nodes of the graph $\mathcal{G}$ are indexed using $g=0, \ldots, G+1$, sorting them in a breadth-first search manner from 0 (non-emitting start node) to G+1 (non-emitting end node). Further, output symbol observed at node g is denoted by $l(g)$, and the transition weight on edge (g, g') (which connects node g with node g') is denoted by $W_{(g,g')}$. Finally, the node sub-sequence of $\pi$ from time index t to t' is denoted by $\pi_{t:t'} = (\pi_t, \ldots, \pi_{t'})$. Further, $\pi_0$ and $\pi_{T+1}$ correspond to the non-emitting start and end nodes 0 and G+1.

In order to compute the conditional probabilities $p(\mathcal{G}|X)$ for a given graph $\mathcal{G}$ efficiently, a forward variable $\alpha$ and a backward variable $\beta$ are computed and the conditional probability $p(\mathcal{G}|X)$ is calculated based on $\alpha$ and $\beta$. To that end, the GTC computes a forward probability (or forward variable) for $g=1, \ldots, G$ using $$\alpha_t(g) = \sum_{\substack{\pi \in S(\mathcal{G},T): \\ \pi_{0:t} \in S(\mathcal{G}_{0:g}, t)}} \prod_{\tau=1}^{t} W_{(\pi_{\tau-1}, \pi_\tau)} y^\tau_{l(\pi_\tau)}, \tag{2}$$

where $\mathcal{G}_{0:g}$ denotes the sub-graph of $\mathcal{G}$ starting at node 0 and terminating at node g. The sum is taken over all possible $\pi$ whose sub-sequence up to time index t can be generated in t steps from the sub-graph $\mathcal{G}_{0:g}$. Further, a backward variable $\beta$ is computed similarly for $g=1, \ldots, G$ using $$\beta_t(g) = \sum_{\substack{\pi \in \delta(\mathcal{G},T): \\ \pi_{t:T+1} \in \delta(\mathcal{G}_{g:G+1}, T-t+1)}} \prod_{\tau=t}^{T} W_{(\pi_\tau, \pi_{\tau+1})} y^\tau_{l(\pi_\tau)}, \tag{3}$$

where $\mathcal{G}_{g:G+1}$ denotes the sub-graph of $\mathcal{G}$ starting at node g and terminating at node G+1. By using the forward and backward variables, the probability function $p(\mathcal{G}|X)$ can be computed for any t by summing over all g:

$$p(\mathcal{G}|X) = \sum_{g \in \mathcal{G}} \frac{\alpha_t(g)\beta_t(g)}{y^t_{l(g)}} \tag{4}$$

For gradient descent training, the loss function $$\mathcal{L} = -\ln p(\mathcal{G}|X) \tag{5}$$

must be differentiated with respect to the network outputs, which can be written as:

$$-\frac{\partial \ln p(\mathcal{G}|X)}{\partial y^t_k} = -\frac{1}{p(\mathcal{G}|X)} \frac{\partial p(\mathcal{G}|X)}{\partial y^t_k} \tag{6}$$

for any symbol $k \in \mathcal{U}$, where $\mathcal{U}$ denotes a set of all possible output symbols or labels.

Because $$\alpha_t(g)\beta_t(g)/y^t_{l(g)}$$

is proportional to $$y^t_{l(g)}$$

$$\frac{\partial (\alpha_t(g)\beta_t(g)/y^t_{l(g)})}{\partial y^t_{l(g)}} = \frac{\alpha_t(g)\beta_t(g)}{y^{t2}_{l(g)}}, \tag{7}$$

and from (4), following can be derived $$\frac{\partial p(\mathcal{G}|X)}{\partial y^t_k} = \frac{1}{y^{t2}_k} \sum_{g \in \psi(\mathcal{G},k)} \alpha_t(g)\beta_t(g), \tag{8}$$

where $$\psi(\mathcal{G}, k) = \{g \in \mathcal{G} : l(g) = k\}$$

denotes the set of nodes in $\mathcal{G}$ at which symbol k is observed.

To backpropagate the gradients through the softmax function, a derivative with respect to the unnormalized network outputs $$u^t_k$$

is needed before softmax is applied, which is $$-\frac{\partial \ln p(\mathcal{G}|X)}{\partial u^t_k} = -\sum_{k' \in \mathcal{U}} \frac{\partial \ln p(\mathcal{G}|X)}{\partial y^t_{k'}} \frac{\partial y^t_{k'}}{\partial u^t_k} \tag{9}$$

By substituting (8) and the derivative of the softmax function $$\frac{\partial y^t_{k'}}{\partial u^t_k} = y^t_{k'} \delta_{kk'} - y^t_{k'} y^t_k$$

into (9), equation (10) is obtained $$-\frac{\partial \ln p(\mathcal{G}|X)}{\partial u^t_k} = y^t_k - \frac{1}{y^t_k p(\mathcal{G}|X)} \sum_{g \in \psi(\mathcal{G},k)} \alpha_t(g)\beta_t(g), \tag{10}$$

where the fact that $$\sum_{k' \in \mathcal{U}} \frac{1}{y^t_{k'}} \sum_{g \in \psi(\mathcal{G},k')} \alpha_t(g)\beta_t(g) = \tag{11}$$

$$\sum_{k' \in \mathcal{U}} \sum_{g \in \psi(\mathcal{G},k')} \frac{\alpha_t(g)\beta_t(g)}{y^t_{l(g)}} = \sum_{g \in \mathcal{G}} \frac{\alpha_t(g)\beta_t(g)}{y^t_{l(g)}} = p(\mathcal{G}|X),$$

and that $$\sum_{k' \in \mathcal{U}} \frac{\partial \ln p(\mathcal{G}|X)}{\partial y^t_{k'}} y^t_{k'} y^t_k = \frac{1}{p(\mathcal{G}|X)} p(\mathcal{G}|X) y^t_k = y^t_k, \tag{12}$$

is used.

The GTC objective function 105 learns temporal and label alignments from the supervisory information of the directed graph $\mathcal{G}$,, and the GTC objective function 105 is used to train the neural network 101. The training is explained below with respect to FIG. 2.

The neural network 101 is trained using the GTC objective function 105 that enables the neural network 101 to resolve temporal alignment or temporal ambiguity as well as label alignment or label ambiguity in order to learn the optimal alignment between the sequence of probability distributions 111 and the sequences of labels represented by the directed graph 107.

Figure 2:
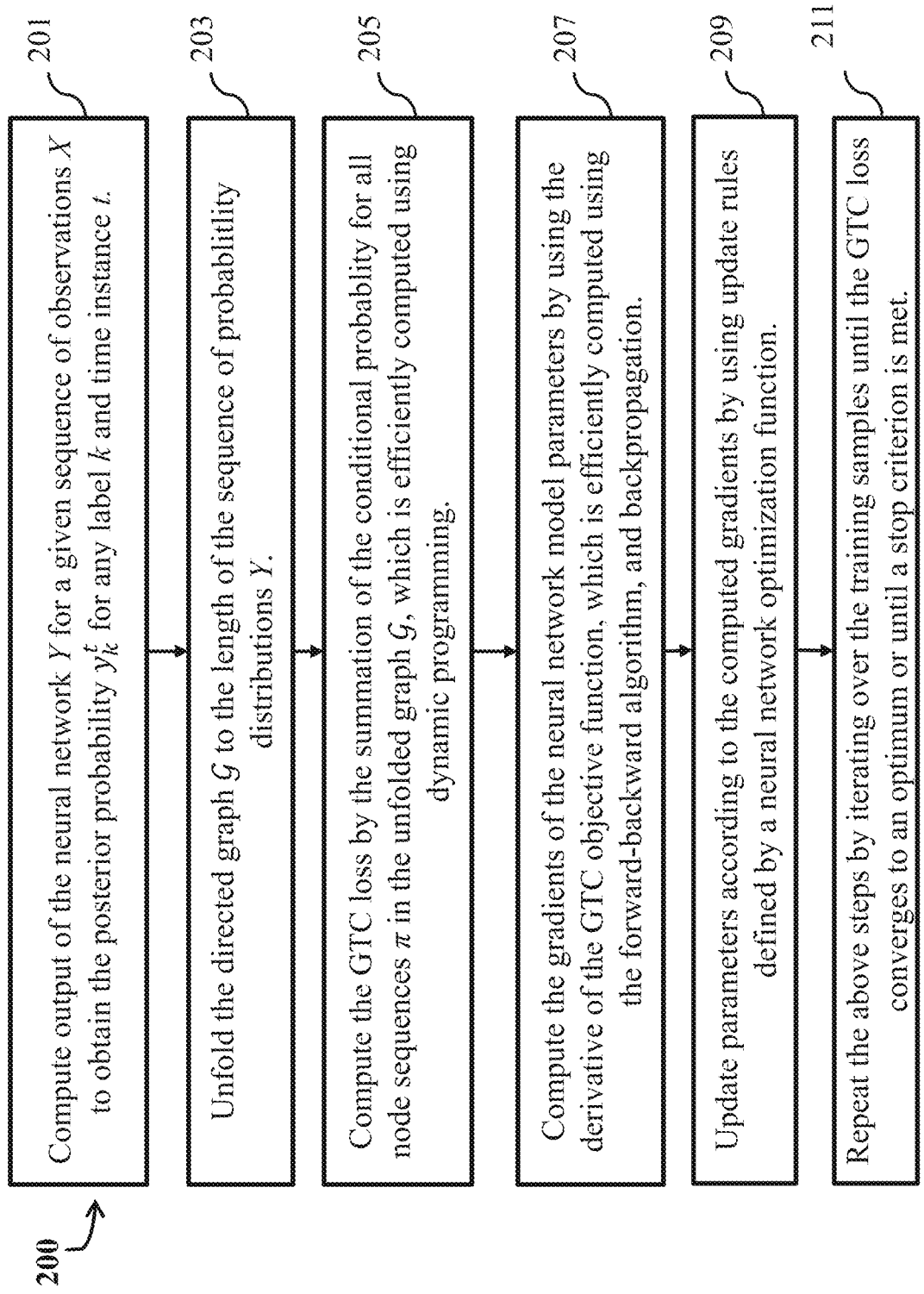
FIG. 2 illustrates steps of a method for training the neural network using the GTC objective function, in accordance with an example embodiment.

FIG. 2 illustrates steps of a method 200 for training the neural network 101 using the GTC objective function 105, in accordance with an example embodiment. FIG. 2 is explained in conjunction with FIG. 1A. In FIG. 2, at step 201, an output of the neural network 101 for the given sequence of observation X is computed to obtain the posterior probability for any output symbol k at time t denoted by $$y_k^t.$$

At step 203, the directed graph $\mathcal{G}$ may be unfolded to the length of the sequence of probability distributions Y. While unfolding the directed graph $\mathcal{G}_{,,}$ labels represented by the nodes and edges of graph $\mathcal{G}$ may get repeated in order to match a length of a sequence of labels to the corresponding length of the sequence of probability distributions Y. The unfolding of the directed graph $\mathcal{G}$ is explained in detail with respect to FIG. 3.

At step 205, a GTC loss function as shown in equation (5) is computed by taking summation of the conditional probability for all node sequences π in the unfolded graph $\mathcal{G}_{..}$. The summation is efficiently computed using dynamic programming.

At step 207, gradients of the neural network parameters are computed using the derivative of the GTC objective function 105 with respect to all possible output symbols as shown in equations (10) and (4) above, which is efficiently computed using the forward-backward algorithm and back propagation. To that end, the forward-backward algorithm determines the forward variable α and the backward variable β, where α and β are used to determine p($\mathcal{G}$ |X) expressed mathematically in equation (12). More details regarding the forward-backward algorithm are provided later with respect to FIG. 4.

At step 209, parameters of the neural network 101 may be updated according to the gradient computed in step 207. To update the parameters, a neural network optimization function may be implemented that defines rules to update the parameters of the neural network 101. The neural network optimization function may comprise at least one of: Stochastic Gradient Decent (SGD), SGD with momentum, Adam, AdaGrad, AdaDelta, and the likes.

At step 211, it may be determined whether to repeat steps 201 through 209 by iterating over the training samples (i.e., pairs of a sequence of observations and a graph $\mathcal{G}$ ) or over batches of the training samples based on at least one of: the GTC loss converges to an optimum or a stop criterion is met.

Figure 3:
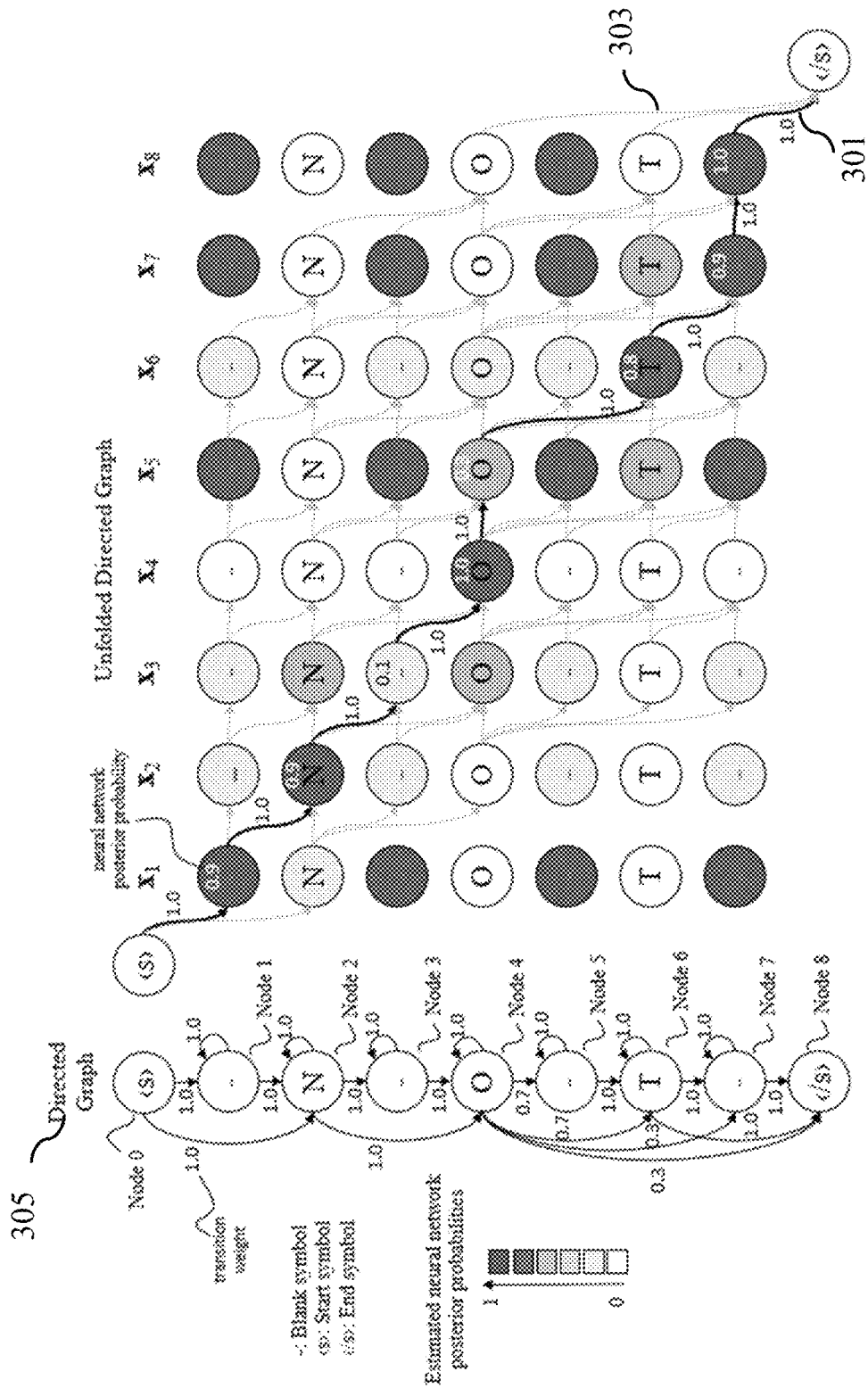
FIG. 3 illustrates the computation of a conditional probability for a node sequence in accordance with an example embodiment.

FIG. 3 illustrates computation of a conditional probability p(π|X) for a node sequence π, in accordance with an example embodiment. On the left side in FIG. 3, a directed graph 305 generated from a list of two hypotheses, "NO" and "NOT", is shown. Nodes of the directed graph 305 are represented by circles and edges by arrows with an associated weight value. Further, for the ease of explanation, each node in the directed graph 305 is referred to as Node 0, Node 1, Node 2, Node 3, Node 4, Node 5, Node 6, Node 7, and Node 8. A sequence of nodes from the node 0 to node 8 corresponds to a sequence of labels. There are different types of labels comprised by the sequence of nodes to indicate a start node, a blank node, and an end node of the sequence of nodes. For example, "-" label is a blank symbol that represents the blank node, <s> label is a start symbol that represents the start node of the sequence of nodes, and </s> is an end symbol that represents the end node of the sequence of nodes.

On the right side in FIG. 3, an unfolded graph for an observations sequence X of length 8 is shown, here no downsampling is conducted by the neural network 101. Further, in FIG. 3, a node sequence and path π (e.g. path 301) are represented by the solid black arrows. As an example, the label posterior probabilities estimated by the neural network 101 are indicated by the colors of the nodes for every time instance t. The conditional probability of the node sequence π is computed by the multiplication of the estimated posterior probabilities of the labels observed at every node and the transition weights connecting the nodes. For example, for the node sequence π=(0,1,2,3,4,5,6,7,7,8), which is highlighted by the solid lines, the conditional probability p(π|X) is formulated as equation (13)

$$p(\pi|X) = \tag{13}$$
$$W_{(\pi_T,\pi_{T+1})}\prod_{\tau=1}^{T}W_{(\pi_{\tau-1},\pi_\tau)}p_\tau(l(\pi_\tau)|X) = 1.0*(1.0*0.9*1.0*$$
$$0.9*1.0*0.1*1.0*1.0*1.0*0.3*1.0*0.8*1.0*0.9*1.0*1.0)$$

where
$p_\tau(l(\pi_\tau)|X)$ represents the posterior probability of a label observed at node $\pi_\tau$ and time instance τ, and $W_{(\pi_{\tau-1},\pi_\tau)}$ represents the transition weight residing on edge $(\pi_{\tau-1},\pi_\tau)$.

For the computation of the GTC loss, the conditional probabilities of all paths (303), which are shown by the gray lines connecting the nodes, are computed and summed. The sum of the conditional probabilities of all paths can be efficiently computed using dynamic programming.

Figure 4:
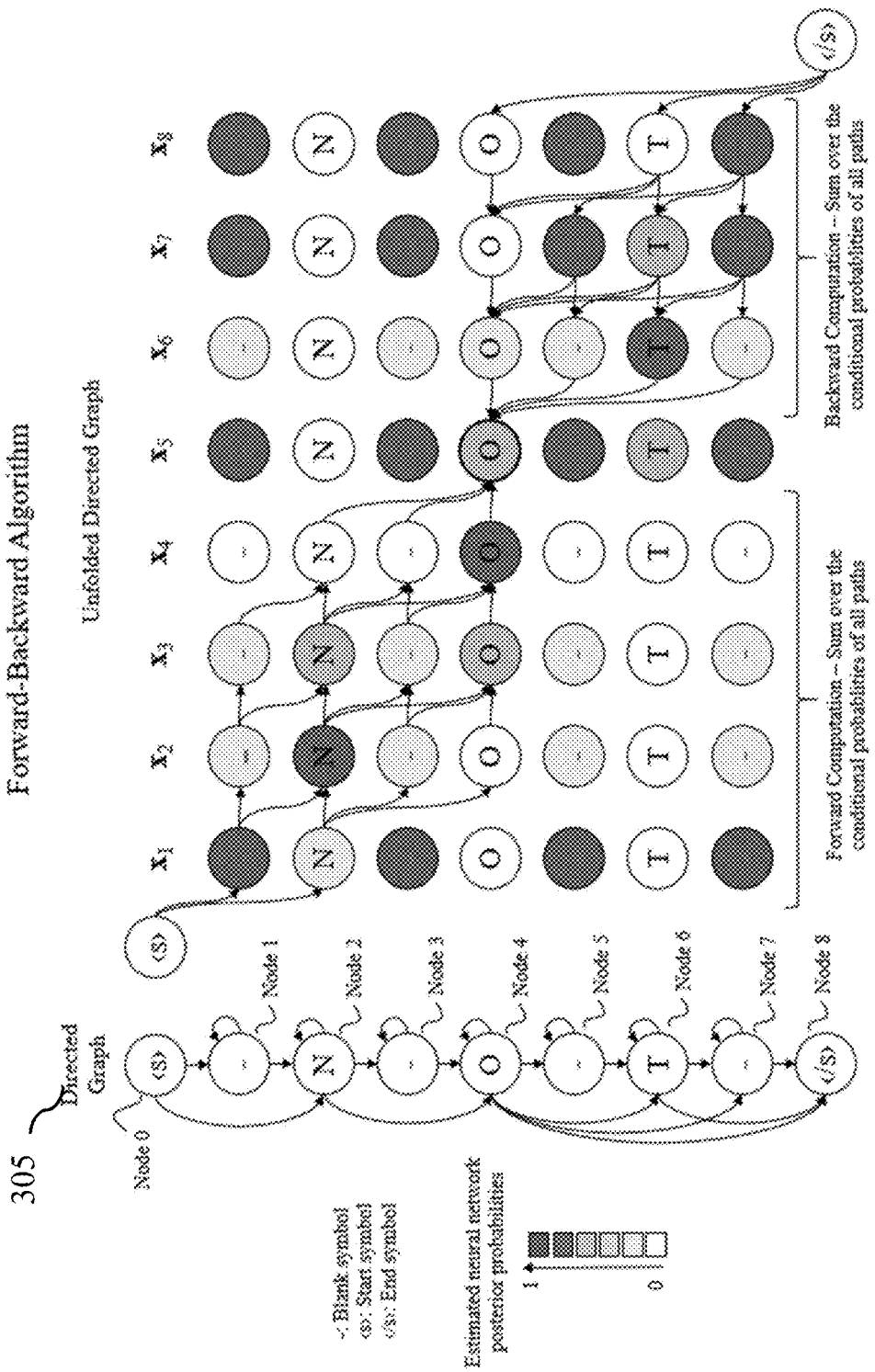
FIG. 4 illustrates an implementation of a forward-backward algorithm to determine marginal probability, in accordance with an example embodiment.

FIG. 4 illustrates implementation of a forward-backward algorithm to determine marginal probability, in accordance with an example embodiment. In order to determine the sum of conditional probabilities of all paths (303) in the directed graph 305 illustrated in FIG. 3, it is important to first compute the marginal probability of every node for every time instance t. For example, to compute the marginal probability of Node 4 at t=5, the sum of the conditional probabilities of all paths going through Node 4 at t=5 can be efficiently computed using the forward-backward algorithm and dynamic programming.

In a forward step, the summed conditional probability of all paths starting at Node 0 (for t=0) and ending at Node 4 at time t=5 is computed, which is stored in a forward variable α. In a backward step, the summed conditional probability of all paths starting at Node 8 (the end node) going backward to Node 4 at t=5 is computed, which is stored in a backward variable β. Finally, the marginal probability of Node 4 for t=5 is derived by the multiplication of α and β which is divided by the posterior probability of the label emitted at Node 4 at t=5, according to equation (4) above, since otherwise the posterior probability would be counted twice. Both, the forward and backward variables are efficiently computed using dynamic programming.

Generation of the Directed Graph

In some embodiments, the directed graph is associated with a confusion network. Multiple sequences of labels are converted into the confusion network in order to generate the directed graph. The confusion network corresponds to a simple linear directed acyclic graph with a property that each path from a start node to an end node goes through all the other nodes. Edges between two nodes of such a graph represent a set of labels, and the set of labels is called a confusion set. The detailed description of the directed graph with respect to the confusion network is described further with reference to FIGS. 5A to 5F.

Figure 5A:
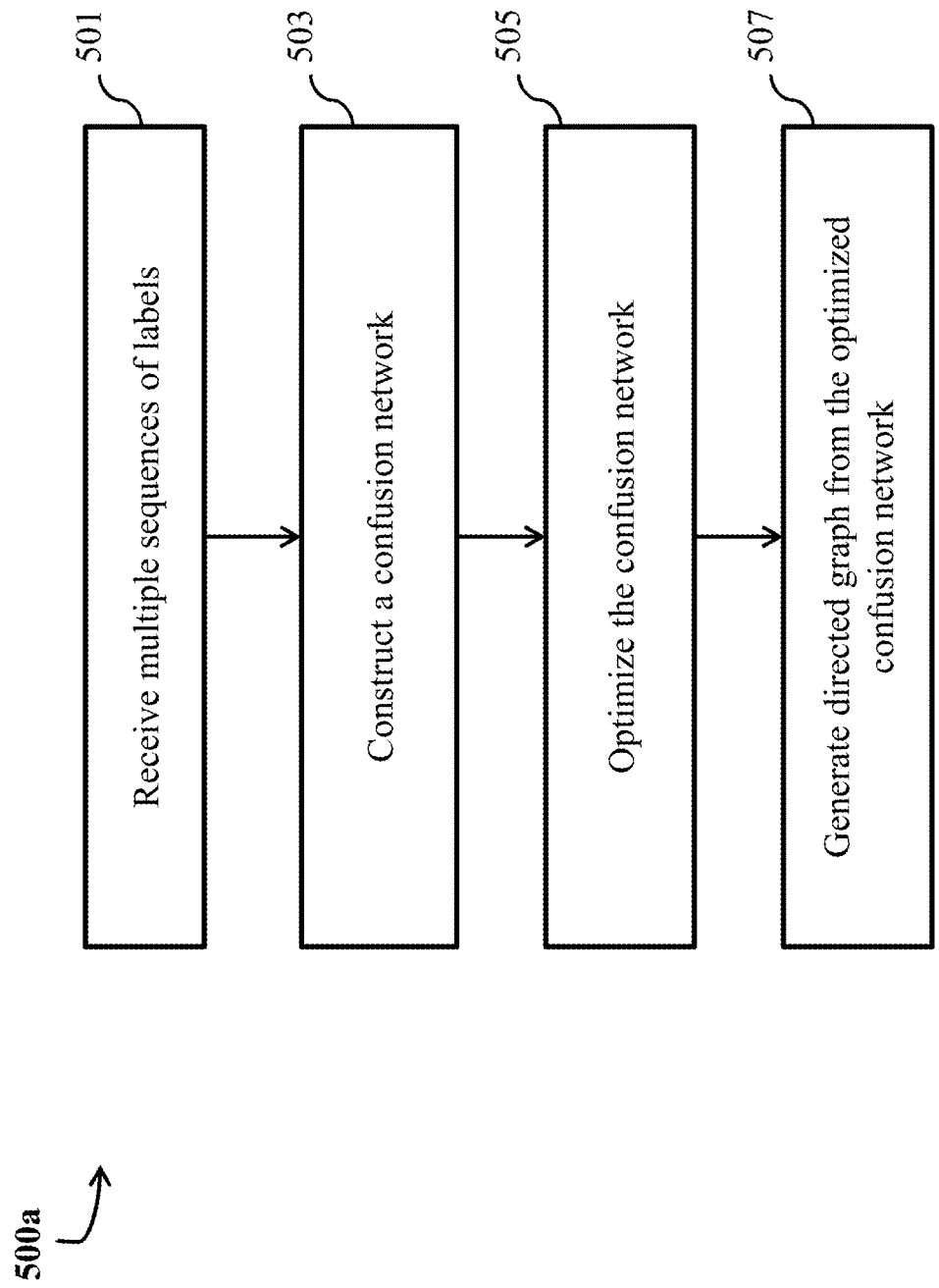
FIG. 5A illustrates a method of converting multiple sequences of labels into a confusion network used to generate a directed graph, in accordance with an example embodiment.

FIG. 5A illustrates a method 500a of converting multiple sequences of labels into a confusion network used to generate a directed graph, in accordance with an example embodiment.

The method 500a starts at step 501, where multiple sequences of labels may be received for the generation of the directed graph. In an example embodiment, labels may correspond to letters, words, sub words of any language. In another embodiment, labels may correspond to the name of sound-producing entities (such as cat, dog, human, car, and the likes) detected by a sound event detector system.

At step 503, the multiple sequences of labels may be used to construct a confusion network. The confusion network (also referred to as sausage) is a graph where all the nodes of the graph are connected via edges, and labels are on the edges. Thus, the confusion network is a compact representation of multiple label sequences aligned with each other. For example, assume that labels corresponding to letters of English language are obtained. Suppose the letters comprises A, B, C, D, E, and X. Then for given two label sequences A B C D and X B D E, an alignment between the two sequences can be represented as:
 ABCDε
 XBεDE,
where ε denotes "no label" or an epsilon node, which corresponds to deletion or insertion.

Similarly, two sequences of labels may correspond to names of sound sources detected by the sound event detector, for example, "cat, dog, baby, human" and "cow, dog, human, car". Thus, the alignment between these two sequences can be represented as:
 cat dog baby human ε
 cow dog ε human car.

The alignment may be obtained by a dynamic programming method, which minimizes edit distance between the two label sequences. The edit distance is a way of quantifying how dissimilar two strings (e.g., labels) are to one another by counting the minimum number of operations required to transform one string into the other. For example, the edit distance may be computed using a Levenshtein distance that allows counting the deletion, insertion, and substitution errors of characters in the string. Further, for the obtained alignment, a confusion network 509 can be constructed as shown in FIG. 5B.

FIG. 5B illustrates the confusion network 509 generated based on alignment between two sequences of labels, in accordance with an example embodiment. The two sequences of labels comprise sequences "A B C D ε" and "X B ε D E". In FIG. 5B, the confusion network 509 comprises 515a, 515b, 515c, 515d, 515e, and 515f, where the black node indicates a final node 515f. Further, the confusion network 509 comprises a plurality of arcs, where each arc corresponds to either an arc with a label or an arc with no label (or epsilon label i.e., ε). The symbol ε represents an epsilon (or no) label. For example, arc 509a and 509b correspond to arcs with epsilon labels (ε). For more than two label sequences, the first two sequences are aligned to construct a confusion network, and then the confusion network and another label sequence can be aligned to construct a new confusion network for the three label sequences. If there is a third sequence Y B C D F in addition to the above two exemplary sequences, then the confusion network 501 is modified to a confusion network 511 as shown in FIG. 5C.

FIG. 5C illustrates the confusion network 511 generated based on alignment between three sequences of labels, in accordance with an example embodiment.

By repeating this procedure (in step 503), a confusion network for any number of label sequences can be obtained. A score $S_i(t)$ of label t (or c) in the i-th column may be computed based on log probability scores of the label sequences as:

$$S_i(t) = \log \frac{\sum_{w \in W : t \in w} e^{\mu S(w)}}{\sum_{w \in W} e^{\mu S(w)}}, \quad (14)$$

where W is the set of label sequences (ASR hypotheses), S(w) is the log probability score of sequence w, and μ is a scaling factor.

It may also be repeated to obtain a new reference R as $$R = r_1, \ldots, r_M \text{ such that } r_i = \underset{t \in C_i}{\mathrm{argmax}} S_i(t) \quad (15)$$

and take the alignment between R and each of all the other label sequences to construct a new confusion network until no changes are made for the new confusion network from the previous confusion network. In the above equation, $C_i$ is the set of labels in the i-th column of the previous confusion network and M is the number of columns.

Further, at step 505, the constructed confusion network may be optimized. To that end, an epsilon removal operation can be applied to the confusion network to remove arcs with ε labels (such as arcs 509a and 509b), where ε represents epsilon (or no) label. Since the ε label allows to skip all other labels in the same column, it makes the computation of GTC forward and backward scores more complicated. Removing ε labels from the confusion network makes the GTC loss computation more efficient. In the epsilon removal operation, arcs with ε labels (509a and 509b) are removed by substituting them with new arcs to all the nodes that can be reached with only ε labels plus one non-ε label. If there is no next non-ε label, the destination node changes to a final node. The confusion network 511 can be optimized by the epsilon removal operation as shown in FIG. 5D.

FIG. 5D illustrates a confusion network 513 optimized by the epsilon removal operation, in accordance with an example embodiment. To further reduce the confusion network 511, redundant nodes and arcs can be removed by weighted determinization and minimization operations, resulting in an optimized confusion network 513. Pruning arcs with small scores, which are less than a threshold, may also be applicable to the confusion network before and/or after the epsilon removal, weighted determination, and minimization operations.

Finally, at step 507 a directed graph may be generated from the optimized confusion network 513. Rules for generating the directed graph are explained below with reference to FIG. 5E and corresponding example is described with reference to FIG. 5F. Further, FIG. 5E and FIG. 5F are explained in conjunction with FIG. 5A and FIG. 5D.

Figure 5E:
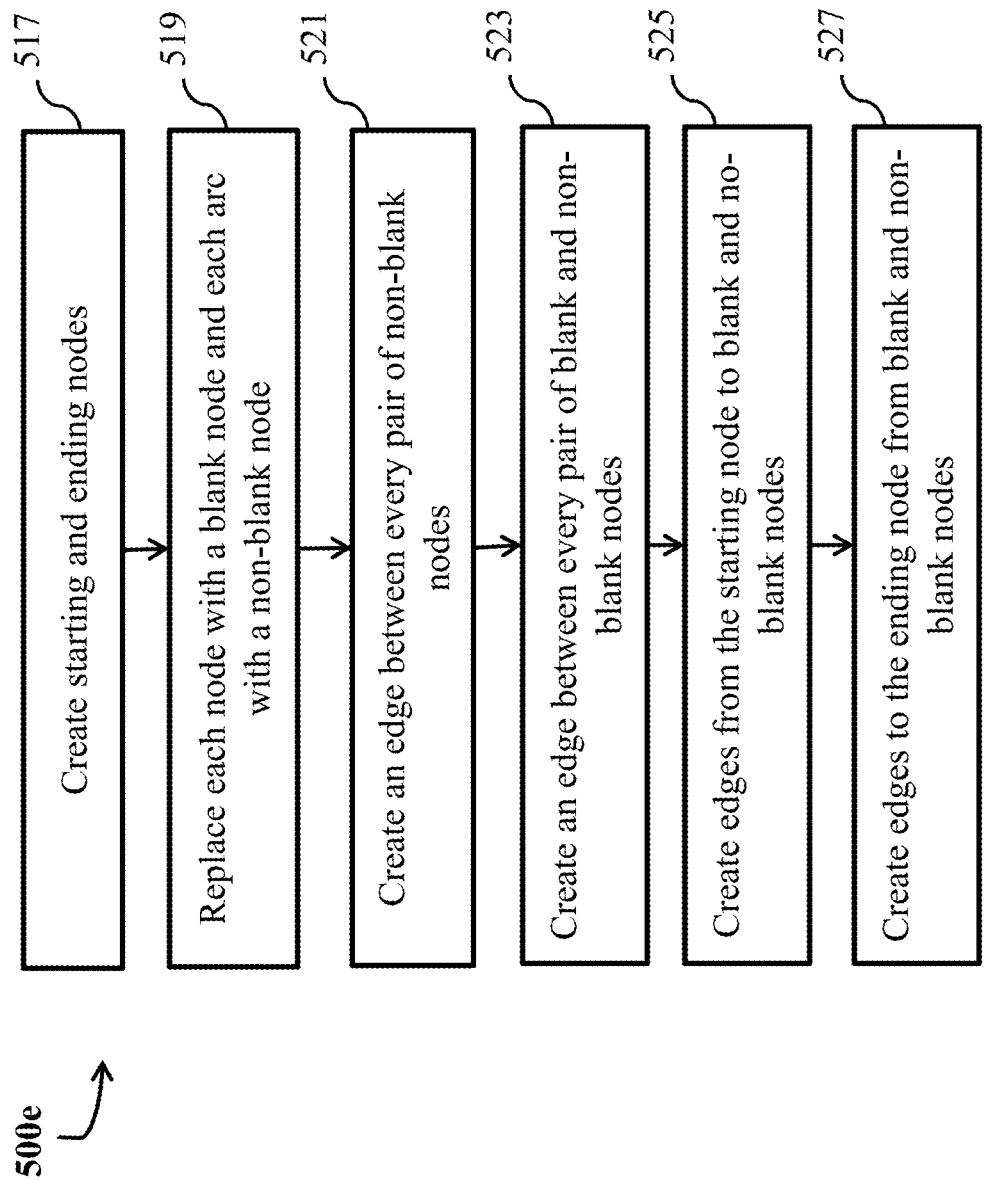
FIG. 5E illustrates a method for generating the directed graph from the optimized confusion network, in accordance with an example embodiment.
Figure 5F:
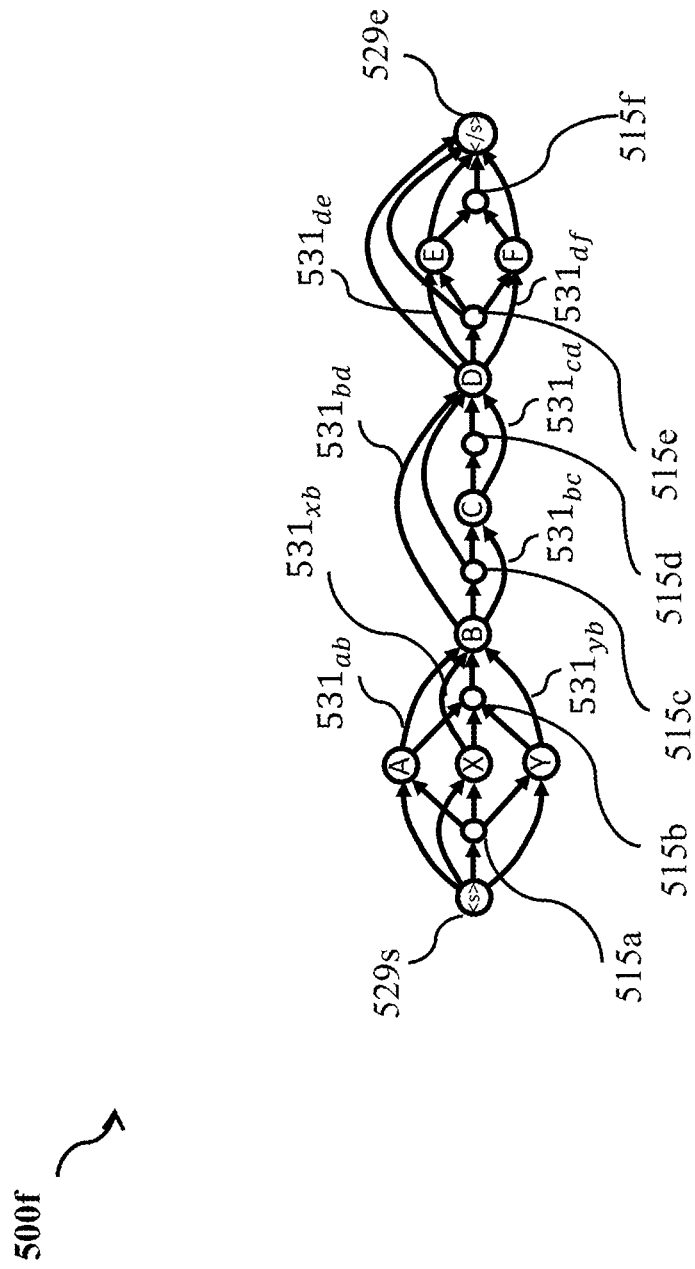
FIG. 5F illustrates a directed graph generated using steps of the method illustrated in FIG. 5E, in accordance with an example embodiment.

FIG. 5E illustrates method 500e for generating the directed graph from the optimized confusion network 513, in accordance with an example embodiment. FIG. 5F illustrates a directed graph 500f generated using steps of method 500e illustrated in FIG. 5E, in accordance with an example embodiment.

The optimized confusion network 513 is converted to the directed graph (or label graph) for GTC training using the following procedure:

At step 517, starting and ending nodes labeled with "<s>" and "</s>", respectively are created. For example, in FIG. 5F a starting node 529s and an ending node 529e are created.

At step 519, for nodes and arcs in the optimized confusion network, each node is replaced with a blank node, and each arc is replaced with a non-blank node to which the arc label is assigned, where if multiple arcs have the same label and the same destination node in the optimized confusion network 513, the arcs are converted to a single node in the graph. For example, arc labels A, X, and Y in the optimized confusion network 513 are converted into non-blank nodes A, X, and Y.

At step 521, an edge is created between every pair of non-blank nodes if the paired arcs corresponding to the non-blank nodes are connected, i.e., the destination node of one arc is the same as the source node of the other arc in the optimized confusion network. For example, in FIG. 5F an edge $531_{ab}$ is created between non-blank nodes A and B in the directed graph 500f because in the corresponding optimized confusion network 513, the destination node of arc with label A is the same as a source node of arc with label B. Therefore, the edge $531_{ab}$ is created between the non-blank node A and B. Similarly, edges $531_{Xb}$, $531_{yb}$, $531_{bd}$, $531_{bc}$, $531_{cd}$, $531_{de}$, $531_{df}$ are created. Further, if the labels of the non-blank nodes are the same, the edge is not created according to the rule that a blank node cannot be skipped if the adjacent non-blank nodes have the same labels.

At step 523, an edge is created between every pair of blank and non-blank nodes if the paired node and arc corresponding to the blank and non-blank nodes, respectively, are connected in the optimized confusion network 513. For example, an edge is created between the blank node 515a and the non-blank node A because in the corresponding optimized confusion network 513, the blank node 515a and arc with label A are connected. The blank node 515a is the source node of the arc with label A. Similarly, edges between the blank node 515a to the non-blank node X and non-blank node Y are created. Accordingly, edges between the non-blank node A and the blank node 515b, the non-blank node X and the blank node 515b, and the non-blank node Y and the blank node 515b, and so on.

At step 525, edges are created from the starting node to blank and non-blank nodes, respectively, if the blank node is originally the initial node or the non-blank nodes are originally the arcs from the initial node in the optimized confusion network 513. For example, an edge is created between the starting node 529s and the blank node 515a as the blank node 515a is originally the initial node in the optimized confusion network 513. Similarly, edges are created between the start node 529s and the non-blank nodes A, X, and Y because in the corresponding optimized confusion network 513, the non-blank nodes A, X, and Y correspond to arcs (with labels A, X, and Y) from the initial node 515a.

At step 527, edges are created to the ending node from blank and non-blank nodes if the blank node is originally a final node or the non-blank nodes are originally arcs to a final node in the optimized confusion network 513. For example, an edge is created from the bank node 515f to the ending node 529e because in the corresponding optimized confusion network 513 the blank node 515f is a final node. Similarly, edges are created from non-blank nodes D, E, and F because in the corresponding optimized confusion network 513, the non-blank nodes D, E, and F correspond to arcs to the final node 515f.

Further, label sequences having the same order of labels arranged differently in time or having different padding with blank labels are considered the same label sequences and are treated as the single label sequence. In the GTC setting with non-monotonic alignment, after collapsing label sequences, where the collapsing removes the repetition of the duplicated labels and then the blank labels in the label sequences produce multiple sequences of labels.

According to this procedure, the above example of the optimized confusion network is converted to the directed graph 500f shown in FIG. 5F.

Exemplary Embodiments

The GTC objective function can be used to train a neural network for various applications such as ASR, acoustic event detection, transcription (or text) recognition, and the likes.

For example, in the ASR system, a neural network may be trained using a semi-supervised training method, where typically a training dataset comprises a small amount of labeled training data and a larger amount of unlabeled training data.

Figure 7:
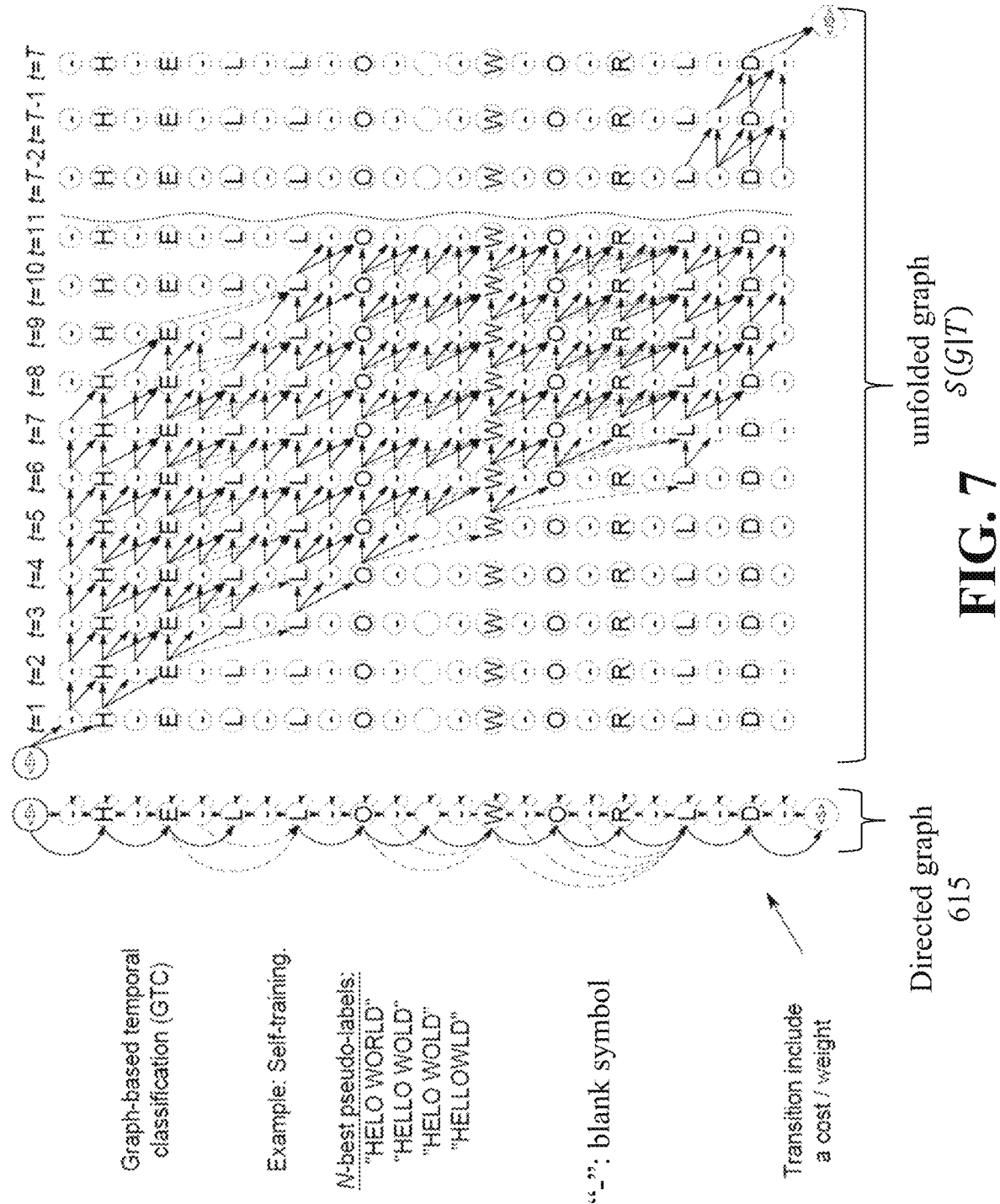
FIG. 7 illustrates an exemplary directed graph used by the GTC objective function in training the neural network, in accordance with an example embodiment.

In the semi-supervised learning method, the GTC objective function allows the usage of an N-best list of ASR hypotheses or a word/token lattice as pseudo labels which is converted into the directed graph $\mathcal{G}$ for training. The pseudo labels or an N-best list of ASR hypotheses are typically generated for the unlabeled data using a baseline system trained with some amount of labeled data. The N-best hypotheses for an unlabeled utterance are then used to form a directed graph (for example, the directed graph 107). As an example, the directed graph representing the N-best hypotheses list is shown in FIG. 7. For computational reasons, it is preferable to make the directed graph compact while retaining the correct hypotheses.

In some embodiments, to generate the directed graph from the N-best hypotheses, the N-best hypotheses are converted into a confusion network also known as a sausage. The N-best hypotheses are converted to a sausage-form confusion network (CN) using minimum Bayes risk (MBR) decoding. The MBR decoding aims to find candidate hypothesis (or N-best hypotheses) that has the least expected loss under a given probability model.

Further, the CN is converted into an optimized Weighted Finite State Transducers (WFST) by applying the epsilon removal, determinization, and minimization operations to the CN, where the arc weights are operated in log-semiring to ensure the WFST remains probabilistic.

In some embodiments, the WFST is converted into the directed graph (as explained earlier with reference to FIG. 5E and FIG. 5F) by replacing each state with a blank node and each arc with a non-blank node to which the arc label is assigned, where edges between the nodes are based on the optimized WFST structure and a rule that each blank node can be skipped if the adjacent non-blank nodes have different labels.

In some embodiments, a scaling factor can be applied to the ASR score (log probability) of each hypothesis when the N-best hypotheses are being converted into the CN. The scaling factor indicates the degree to which the ASR scores are reflected in the label probabilities in the CN, where $\mu=1$ indicates the ASR scores are used without alteration, and μ=0 indicates that the hypotheses are treated equally without considering the ASR scores. In some alternative embodiments, pruning steps can be added after the CN is converted into the WFST to reduce the size of the directed graph, which eliminates arcs if the assigned probabilities are less than a threshold η.

In some embodiments, the GTC has user-defined transition rules to model the different transitions between the nodes and labels.

In some embodiments, the GTC transition rules allow the usage of user-defined blank labels to be used as filler symbols.

Further, the GTC objective function may be used to train the neural network corresponding to different applications such as ASR, computer vision, or the likes based on the supervised information obtained from the directed graph. Generation of the directed graph and training the neural network based on the directed graph for some of these applications are explained below.

Figure 6:
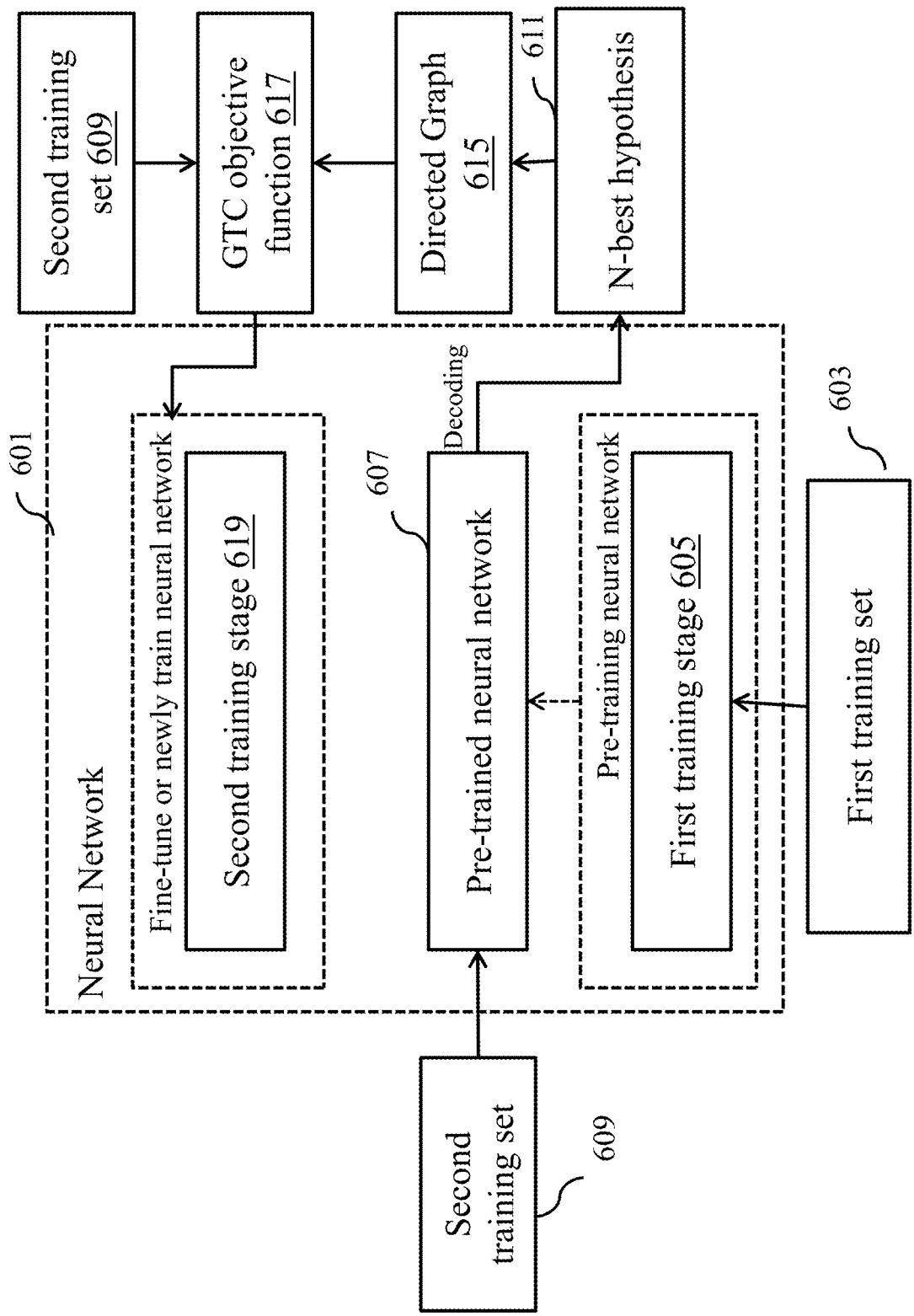
FIG. 6 is a schematic diagram illustrating the workflow of training a neural network for automatic speech recognition (ASR) with a graph-based temporal classification (GTC) objective function, in accordance with an example embodiment.

FIG. 6 is a schematic diagram illustrating a workflow of training a neural network 601 for automatic speech recognition (ASR) with a graph-based temporal classification (GTC) objective function 617, in accordance with an example embodiment. The neural network 601 is trained in two training stages a first training stage 205 and a second training stage 619.

In the first training stage 605 (also called as pre-training stage), the neural network 601 is pre-trained. To that end, the neural network 601 is trained using a first training set 603. The first training set 603 includes data indicative of labeled speech utterances. The pre-trained neural network 607 is used to decode unlabeled data in a second training set 609 to obtain an N-best list of hypotheses 611 for each data sample in the second training set 609. In an example embodiment, the first training set 603 may be used to train a seed ASR model, where the seed ASR model is used to decode the unlabeled data in a second training set 609 to obtain an N-best list of hypotheses 611 for each data sample in the second training set 609. The N-best list of hypotheses 611 corresponding to each data sample is converted into a directed graph 615 as described above (with reference to FIG. 5E and FIG. 5F). The directed graph 615 and the second training set 609 are then used by the GTC objective function 617 to learn a temporal alignment and a label alignment of labels in the directed graph 615 to obtain an optimal pseudo-label sequence from different label sequences in the directed graph 615. Further, the GTC objective function 617 is used to either fine-tune the pre-trained neural network 607 or newly train the neural network 601 in the second training stage 619 such that the training in the second stage 619 updates the neural network 601 to reduce a loss with respect to the optimal pseudo-label sequence. A detailed explanation regarding the generation of the directed graph 615 for semi-supervised learning and self-training is explained below with respect to FIG. 7.

FIG. 7 illustrates an exemplary directed graph 615 used by the GTC objective function 617 in training the neural network 601, in accordance with an example embodiment. FIG. 7 is explained in conjunction with FIG. 6.

FIG. 7 comprises a directed graph 615 on the left side with the unfolded graph on the right side, which is generated from a list of pseudo-labels (or a list of hypotheses) using character-based label symbols. For ease of explanation, assume that the N-best list of pseudo-labels using the character-based label symbols comprises: "HELOWORLD", "HELLO WOLD", "HELO WOLD", "HELLOWLD". Circles in the FIG. 7 denote nodes with a corresponding label symbol observation inside, where "-" is the blank symbol. Further, black arrows in the FIG. 7 correspond to transitions of correct label paths and dotted black arrows to transitions of alternative label paths. Although the correct transcription is not present in the given exemplary N-best list, it can be recovered from the directed graph 615 by providing transition weights for transitions of labels corresponding to each hypothesis in the N-best list of hypotheses.

Further, to recover the correct transcription from the directed graph 615, each hypothesis in the N-best list of hypotheses may be provided scores and ranked according to the scores such that a hypothesis with the highest score has the lowest rank. Based on the ranks and scores transition weights may be assigned to the edges of the directed graph 615. For example, higher transition weights may be assigned to transitions of the sequence corresponding to the top-ranked hypothesis, i.e., more likely hypothesis, compared to subsequently ranked hypotheses. The transition weight may increase or decrease the probability of transition from one node to another node in a particular sequence of nodes, where the sequence of nodes may correspond to the sequence of labels. For example, between the pseudo-label sequences, say "HELLO WOLD" and "HELLOWLD", the transition weight for a transition from a node corresponding to label "W" to a node corresponding to label "O" may be 1.0 whereas a transition weight for the transition from the node corresponding to label "W" to a node corresponding to label "L" may correspond to 0.5. The transition weight for the transition from a node corresponding to label "W" to a node corresponding to label "O" is determined to be higher because "HELLO WOLD" may be ranked before "HELLOWLD". The transition weight may increase the probability of a path and associated label sequence for training the neural network 601. The transition weights may be accounted for by the GTC objective during training the neural network 601.

Thus, the GTC-based training of the neural network 601 allows updating the parameters of the neural network 601 by pushing the neural network 601 to optimize the label predictions such that the most probable predicted sequence of labels can be generated by the directed graph 615 encoding the labeling information for a given data sample.

Figure 8A:
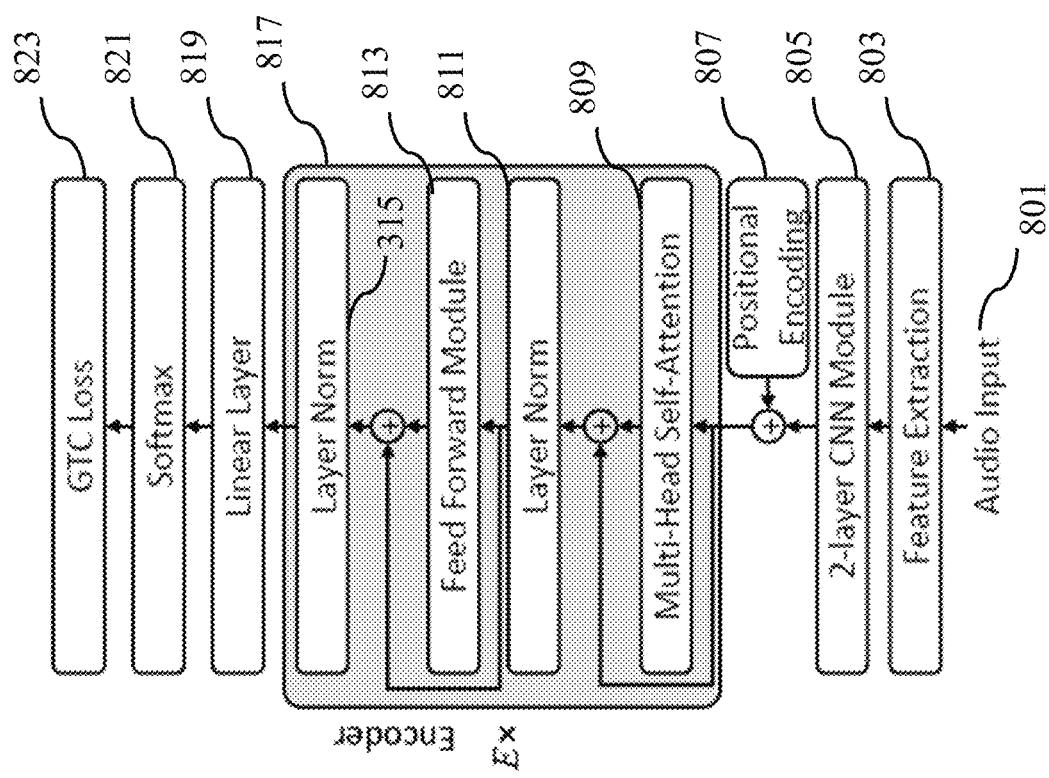
FIG. 8A illustrates a neural network architecture of an ASR system implemented with the GTC objective function, in accordance with an example embodiment.

FIG. 8A illustrates a neural network architecture 800 of an ASR system implemented with the GTC objective function 617, in accordance with an example embodiment. FIG. 8A is described in conjunction with FIG. 6.

In some embodiments, the neural network architecture 800 corresponds to a transformer-based neural network architecture that employs the proposed GTC loss function 823, for training the neural network (e.g. the neural network 101, the neural network 601, and the like), where the GTC loss function 823 corresponds to the GTC objective function 617. In the neural network architecture 800, 80-dimensional log mel spectral energies plus 3 extra features for pitch information as acoustic features are used as an input, where the acoustic features are derived from audio input 801 using a feature extraction module 803.

In some embodiments, the neural network architecture 800 consists of a two-layer convolutional neural network (CNN) module 803 followed by a stack of E=12 transformer-based encoder layers with a projection layer plus softmax function 821 at the end to map the neural network output to a posterior probability distribution. In some example embodiments, each layer of the 2-layer CNN module 805 may use a stride of 2, a kernel size of 3×3, 320 channels, and a rectified linear unit (ReLU) activation function. In addition, a linear neural network layer 819 is applied to the output of the last CNN layer. Sinusoidal positional encodings 807 are added to the output of the 2-layer CNN module 805 before feeding it to the transformer-based encoder 817. Each transformer layer employs 320-dimensional multi-head self-attention layers 809 with 4 attention heads, layer normalization 811 and 815, and a feed-forward neural network module 813 of inner dimension 1540. Residual connections are applied to the multi-head self-attention 809 and the output of the feed-forward module 813. Dropout with a probability of 0.1 is used after the multi-head self-attention 809 and after the feed-forward module 813 as well as for the inner dimension of the feed-forward module 813.

In some embodiments, SpecAugment-based data augmentation is utilized for training. In one specific example, ASR output symbols consist of a blank symbol plus 5000 sub-words obtained by the SentencePiece method, which are generated from the transcripts of the "clean" 100h LibriSpeech training data subset only. The ASR model is trained for 100 epochs using the Adam optimizer with $\beta_1=0.9$, $\beta_2=0.98$, $\in=10^{-9}$, and Noam learning rate scheduling with 25000 warmup steps and an initial learning rate factor of 5.0.

In some embodiments, a language model (LM) is employed via shallow fusion at inference time, which consists of 2 long short-term memory (LSTM) neural network layers with 1024 units each trained using stochastic gradient descent and the official LM training text data of LibriSpeech, where sentences that occur in the 860 h training data subsets are excluded. ASR decoding is based on a time-synchronous prefix beam search algorithm. A decoding beam size of 30, a score-based pruning threshold of 14.0, an LM weight of 0.8, and an insertion bonus factor of 2.0 are used.

Further, details regarding training a neural network using the proposed GTC objective function for embodiments associated with the ASR system is provided below. Further, the results of the trained ASR system are described later with respect to FIG. 8B and FIG. 8C. However, the principles described below can be adapted for other types of systems.

In order to train the ASR system, some embodiments use an ASR benchmark the LibriSpeech corpus of read English audio books to train the neural network, which provides about 960 hours of training data, 10.7 hours of development data, and 10.5 hours of test data. The development and test data sets are both split into approximately two halves named "clean" and "other". This separation is based on the quality of the recorded speech utterances, which was assessed using an ASR system. The training data is also split into three subsets: "clean" 100 hours, "clean" 360 hours, and "other" 500 hours. The "clean" 100 hours subset is used for supervised training and considers the remaining 860 hours as unlabeled data.

Further, a seed ASR model is trained using the 100 h "clean" training data set of LibriSpeech to generate decoding results for the remaining 860 h LibriSpeech training data and to obtain an N-best list of ASR hypotheses used as pseudo-labels for each utterance. Each N-best list of pseudo-labels is used to generate a confusion network (CN) type of directed graph (FIG. 7) with different settings for pruning. Further, "no", "low", and "high" pruning settings are compared, where a scaling factor of $\mu=0:6$ and a threshold of $\eta=0.02$ for "low" and $\eta=0.05$ for "high" pruning are used. The pruning settings are determined based on experiments using the development test data sets of LibriSpeech, where selected parameters resulted in a good trade-off between the oracle label error rates (LERs) and the graph densities, which ideally should both be small. Pruning reduces the size and density of a graph, as can be identified by the ratio of the number of non-blank nodes in the graph to the number of labels in a reference sequence, the ground-truth transcription: the average graph densities for "no", "low", and "high" pruning are 1.510, 1.233, and 1.119 for the "clean" 360 h training data set, and 1.545, 1.275, and 1.147 for the "other" 500 h training data set.

FIG. 8B shows Table 1 that illustrates the oracle label error rates (LERs) for N-best lists of different sizes N as well as for graphs that are generated from the 20-best ASR hypotheses for each utterance, in accordance with an example embodiment.

In FIG. 8B, the oracle LER [%] for the 860 hours "unlabeled" training data subsets "clean" and "other" using different pseudo-label representations. $CN^{20}$ denotes a confusion network type of graph generated from the 20-best ASR hypotheses for each utterance, where $_{low}$ and $_{high}$ indicate low and high pruning settings.

The oracle LER of an N-best list is obtained by selecting the best pseudo-label sequence from that list, i.e., the sequence that has the smallest edit distance compared to the ground-truth transcription. The oracle LER of a graph corresponds to the minimum edit distance between a finite-state transducer (FST) and a reference sequence, the ground-truth transcription, which is computed by a composition operation between an acyclic FST and an edit-distance FST, followed by a single-source shortest-path algorithm. From Table 1 as shown in FIG. 8B, it can be observed that an N-best list contains ASR hypotheses with much lower error rates compared to the 1-best hypotheses.

For instance, selecting the oracle hypotheses from the 20-best list reduces the average LER by 2.5% (clean 360 h) and 3.0% (other 500 h) on an absolute scale. Using an oracle pseudo-label computed from an N-best list in a graph format reduces the LER even further, since a graph representation of an N-best list allows for more flexible label combinations, as illustrated in FIG. 7.

FIG. 8C shows Table 2 that illustrates GTC-based ASR results for different pseudo-label representations, in accordance with an example embodiment.

Table 2 illustrates word error rates (WERs) [%] of models trained with different pseudo-label representations. "N/A" denotes the seed ASR model, which is used to generate pseudo-labels. Further, "N/A" denotes results of the seed ASR model, which is trained using the 100 h of labeled clean LibriSpeech training data only. "1-best" denotes self-training results using the best ASR hypotheses only. W=1.0 indicates that all transition weights of the graph $CN^{20}$ are set to 1, and W=p that probabilistic transition weights are used. $CN^{20}$ indicates the use of confusion networks that are generated from the 20-best ASR hypotheses obtained from the seed model for each utterance of the 860 h of unlabeled training data.

In Table 2, three different CN setups are compared: a CN without pruning and with all transition weights set to 1.0, a CN with probabilistic transition weights and the low pruning settings, as well as a CN with probabilistic transition weights and high pruning. In addition, ASR results obtained when training on the best pseudo label sequence manually selected from the 20-best list are shown as "oracle 20-best", and results for supervised ASR using the ground-truth transcriptions as "ground-truth".

Table 2 shows that 1-best pseudo-labeling improves the WERs of the LibriSpeech test data sets by a large margin, e.g., from 21.2% to 15.8% for test-other. Training on multiple pseudo-label sequences encoded in graph format further improves the WERs, whereby the best results are obtained when using a CN with high pruning settings and probabilistic transitions weights. Although an unpruned graph is more likely to contain the correct transcription, it is supposed that the large variance in such a graph makes it harder to learn the best label sequence due to more label noise. Therefore, pruning and the use of transition weights can guide self-training to find pseudo-label sequences of lower error rates.

In the best setting, the proposed GTC-based semi-supervised learning approach achieves 1.0% and 0.8% lower WERs for the dev-other and test-other test sets of LibriSpeech, only 0.3% and 0.5% higher compared to the "oracle 20-best" ASR results, which correspond to a lower-bound of the WERs for training on multiple pseudo-labels obtained from an N-best list.

Figure 9A:
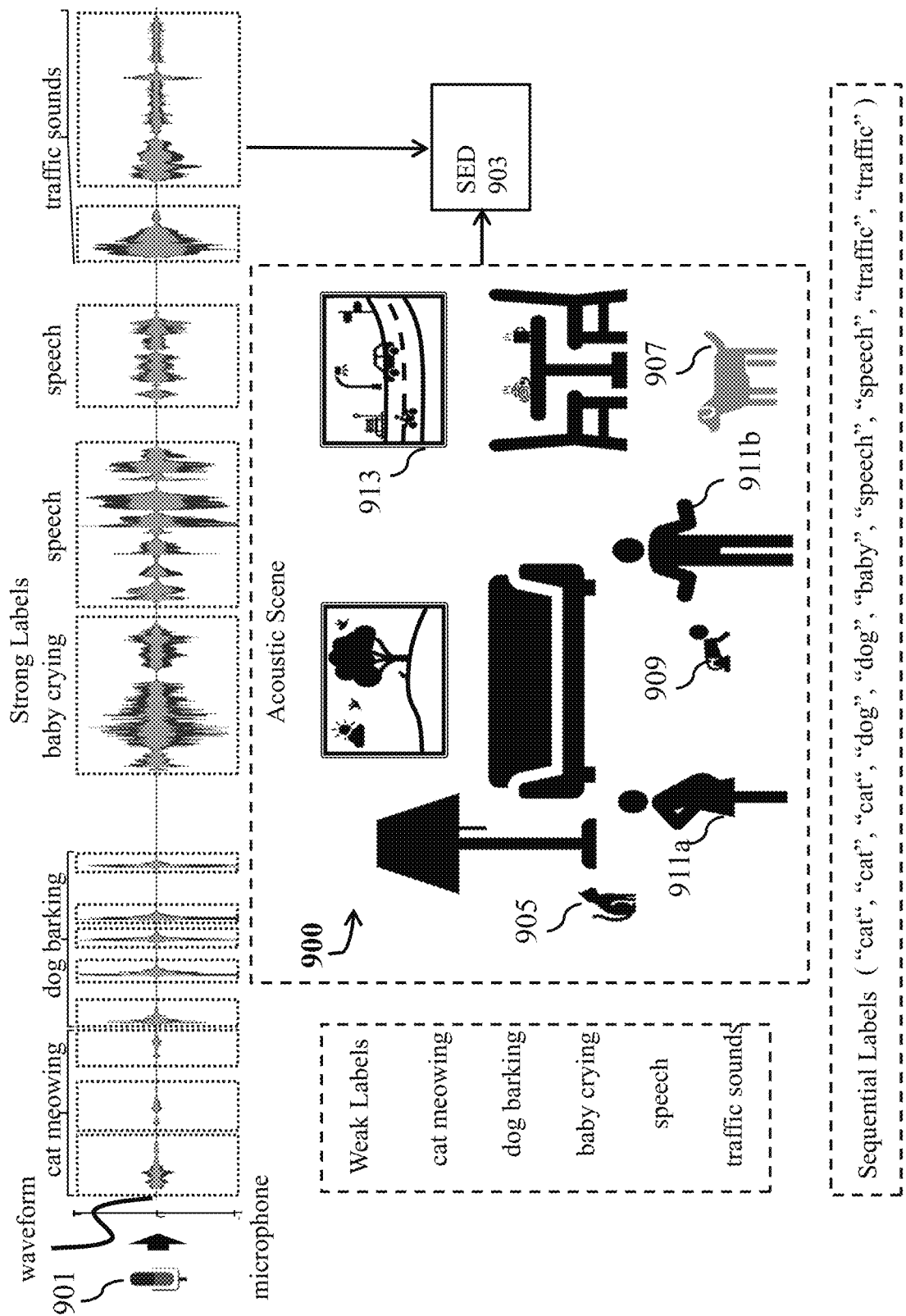
FIG. 9A illustrates an acoustic scene comprising a plurality of entities producing a plurality of sounds to be inputted to a sound event detection (SED) system, in accordance with an example embodiment.

FIG. 9A illustrates an acoustic scene 900 comprising a plurality of entities producing a plurality of sounds to be inputted to a sound event detection (SED) system 903, in accordance with an example embodiment. The plurality of sounds in the acoustic scene 900 may be recorded by a sound recorder e.g., a microphone 901. The recorded data associated with the acoustic scene is provided to the SED system 903. In an example embodiment, a video recorder may be used to record the acoustic scene 900 and video data may be inputted to the SED system 903.

The recorded data comprises the plurality of sounds such as cat meowing sound of a cat 905, dog barking sound of a dog 907, crying sound of a baby 909, speech signals of humans 911a and 911b, and traffic sounds from window 913. The intensity of the sound of interest can be low and the duration of the sounds can be short. Detecting entities corresponding to such low-intensity sounds is a challenging task. There may be other home environment sounds such as sound generated on moving a chair, utensils, and the likes. In order to detect different sound events associated with the plurality of entities in the acoustic scene 900, the SED system 903 should be trained to generate one or more labels corresponding to the detected sound event.

The SED system 903 may be trained to produce labels corresponding to each detected acoustic event, where the labels correspond to the name of entities corresponding to the detected acoustic event. For example, for a detected cat meowing sound the SED 903 should be trained to produce a label cat and the likes.

In the acoustic event classification tasks, training data samples are often weakly labeled to reduce the costs of the labeling processes. Weak labels typically only indicate the presence of an event associated with a label in a training data sample but the label positions, the sequential order of labels, and the label frequency, i.e., how many times an event has occurred in a training data sample, are not annotated. For example, in acoustic scene 900, weak labels may correspond to acoustic events such as a cat meowing and a dog barking. Strong labels on the other hand provide timing information of the events, i.e., the start and end positions of each event are annotated in the training data. In contrast, sequential labeling information does not contain precise timing information about the labels in the training data sample, but the sequential order of the events is provided. For example, in the acoustic scene 900, strong labels may correspond to acoustic events such as baby crying, speech signals, traffic sound.

Further, to train the SED system 903 that needs to detect the start and end positions of each sound event in an audio recording, typically training data with strong labeling information is required. However, in practice, large amounts of training data are only weakly labeled due to smaller annotation costs.

In some embodiments, the SED system 903 is trained with weakly labeled training data using the proposed GTC objective function. The training of the SED system 903 may suffer from a labeling ambiguity as well as a timing ambiguity problem because a set of possible sequential labeling information, which does not include timing information, can be generated from the weak labels. The set of possible sequential information may comprise a set of different possible combinations of labels, where each combination of labels corresponds to a sequence of labels indicating an order of labels. In SED, each label corresponds to an acoustic event or to entities producing an acoustic event, e.g., the weak label information for an audio sample may be "speech", "traffic", "dog", "cat", which only indicates the presence of each of these acoustic events but no timing or ordering information. Given this example, one of the possible sequences of labels (or sequential labels) generated from the weak label information may correspond to the label sequence "cat", "cat", "cat", "dog", "dog", "baby", "speech", "speech", "traffic", "traffic".

However, the number of possible label sequences generated from the weak label information can be relatively large. Thus, prior information about the labeled events can be utilized to limit the size of the generated set of label sequences. For example, statistics about the labeled events, such as typical event frequencies, event durations, and event combinations, can be exploited to exclude unlikely label sequences generated from the weak label information. Thus, the set of sequential label information is generated from the weak label information including the contextual data to limit the number of possible sequential labels. The set of generated sequential label information comprising all possible and valid sequences of labels is used to generate a directed graph, where the directed graph comprises a plurality of nodes and edges representing labels corresponding to the different sound-producing entities in the acoustic scene 900.

Additionally or alternatively, a decoding step with a pre-trained SED model can be used together with the weak label information to find a reduced set of possible label sequences. Once a set of possible label sequences is determined, it can be used to generate a directed graph for the training of the SED system 903 using the GTC objective function 105. The directed graph may be generated according to the process described with respect to FIG. 5A through FIG. 5D.

Figure 9B:
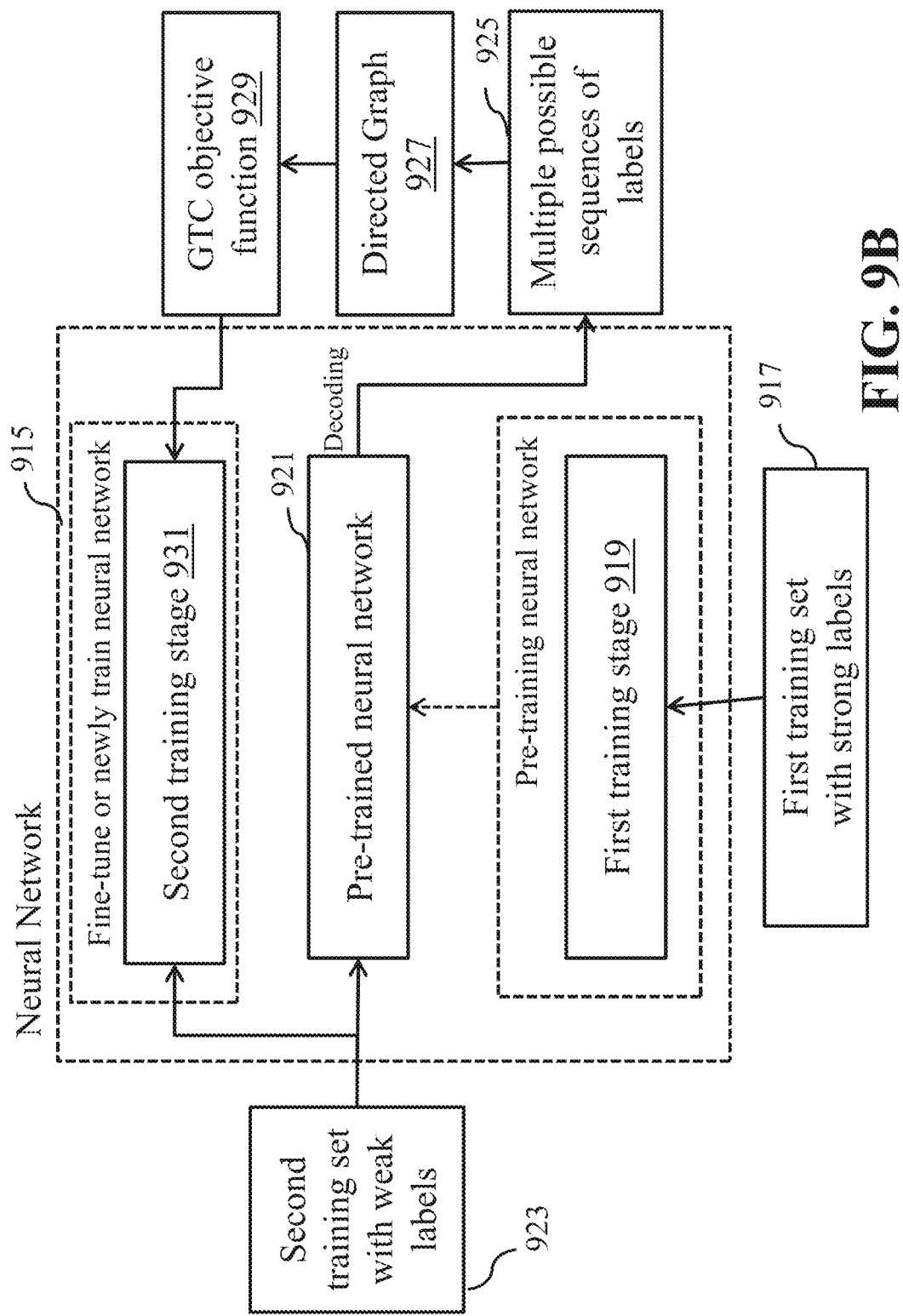
FIG. 9B is a schematic diagram illustrating a workflow of training a neural network corresponding to a sound event detection (SED) system with a graph-based temporal classification (GTC) objective function, in accordance with an example embodiment.

FIG. 9B is a schematic diagram illustrating a workflow of training a neural network 915 for sound event detection (SED) system with a graph-based temporal classification (GTC) objective function 929, in accordance with an example embodiment. The neural network 915 is trained in two training stages, a first training stage 919 and a second training stage 931. In the first training stage 919 (also called as pre-training stage), the neural network 915 is pre-trained. To that end, the neural network 915 is trained using a first training set 917. The first training set 917 includes data indicative of strong labels providing timing information of acoustic events, i.e., the start and end positions of each acoustic event are annotated in the training data comprises in the first training set 917.

Further, the pre-trained neural network 921 is used to decode weakly labeled data (weak label data) in a second training set 923 to obtain multiple possible sequences of labels 925 for each weakly labeled data sample in the second training set 923. The multiple possible sequences of labels 925 are converted into a directed graph 927 as described above (with reference to FIG. 5E and FIG. 5F). The directed graph 927 and the second training set 923 are then used by the GTC objective function 929 to learn a temporal alignment and a label alignment of the label information in the directed graph 927. Further, the GTC objective function 927 is used to either fine-tune the pre-trained neural network 921 or newly train the neural network 915 in the second training stage 931 such that the training in the second training stage 931 updates the neural network 915 to reduce a loss with respect to the GTC objective and the labeling information encoded in the directed graph 927.

In end-to-end ASR, where the neural network output labels may be word-pieces, the set of word-pieces and word decompositions are learned independently of the ASR task, e.g., by using byte pair encoding to find the most common grapheme sequences. However, the learned word decompositions may not be optimal for the downstream ASR task. In some embodiments, the directed graph 107 is formed by at least one of alternative word decompositions or alternative sentence decompositions, where the alternative word decompositions and the alternative sentence decompositions are pre-determined based on byte-pair encoding.

In the alternative sentence decomposition, for a given sentence certain parts of the sentence are identified. Each part of the sentence comprises a set of words originating from the same factual context in such a way that each part of the sentence corresponds to a set of sub-sentences. Accordingly, in some embodiments, the directed graph 107 may comprise a sequence of nodes, where each node corresponds to each part of the sentence. Further, the neural network 101 trained using the GTC objective function 105 may maximize the probability of a sequence of nodes corresponding to the identified parts that are present in the directed graph 107. The sequence of nodes corresponding to the identified parts with maximum probability may then be recombined to obtain a full semantic sentence.

Exemplary Implementations

Figure 10:
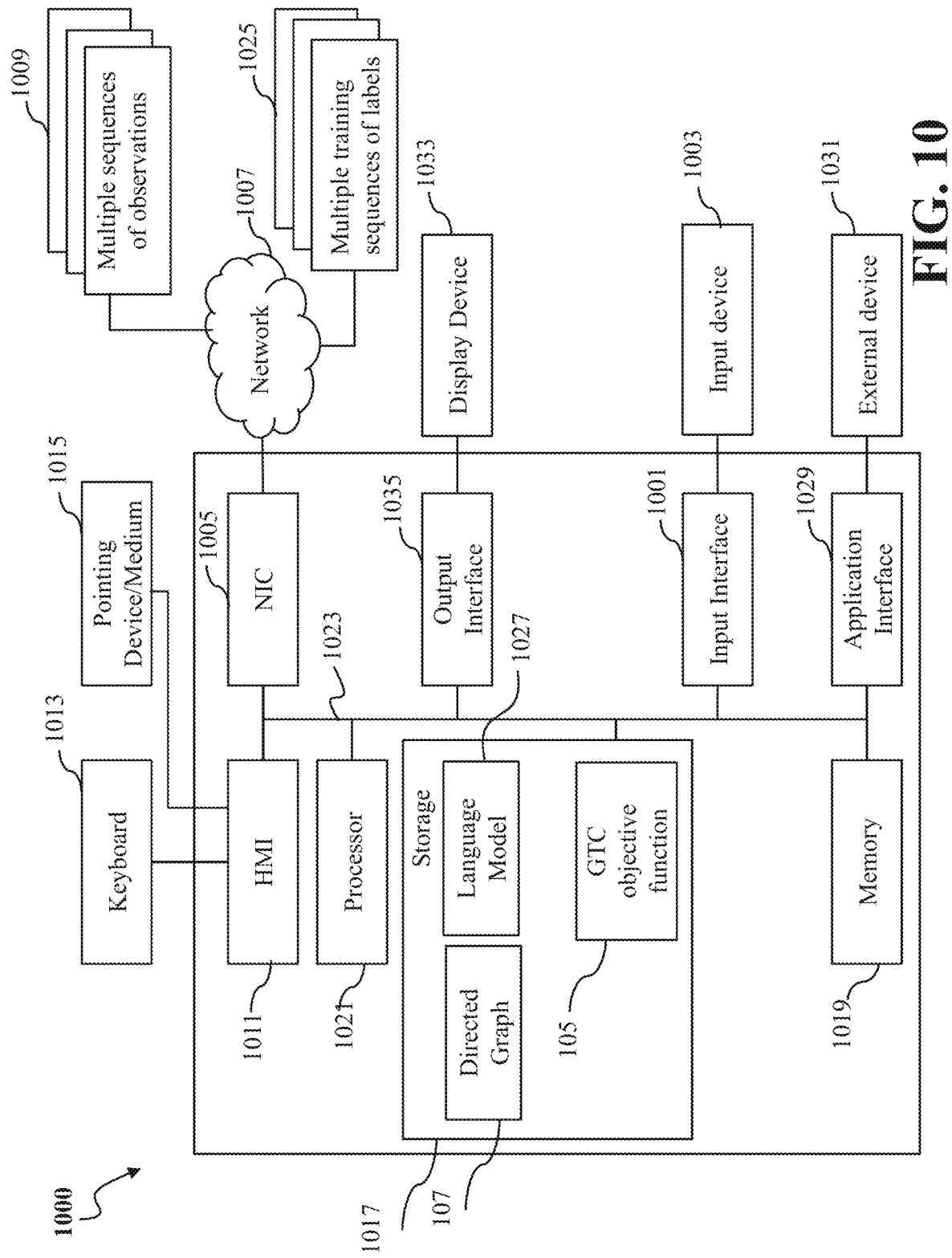
FIG. 10 illustrates a block diagram of a computer-based system trained using the GTC objective function, in accordance with an example embodiment.

FIG. 10 illustrates a block diagram of a computer-based system 1000 trained using the GTC objective function 105, in accordance with an example embodiment. The computer-based system 1000 may correspond to an ASR system, an acoustic event detection system, or the likes.

The computer-based system 1000 includes a number of interfaces connecting the system 1000 with other systems and devices. The system 1000 includes an input interface 1001 configured to accept multiple sequences of observations 1009 such as a stream of acoustic frames representing features of a speech utterance. Additionally or alternatively, the computer-based system 1000 can receive multiple sequences of observations from various other types of input interfaces. In some embodiments, the system 1000 includes an audio interface configured to obtain the multiple sequences of observations 1009 (i.e., the stream of acoustic frames) from acoustic input devices 1003. For example, the system 1000 may use the multiple sequences of observations 1009 comprising acoustic frames in the ASR application or acoustic event detection applications.

The input interface 1001 is further configured to obtain multiple training sequences of labels 1025 for each sequence of observations of the multiple sequences of observations 1009, where there is no temporal alignment between the multiple training sequences of labels 1025 and a sequence of probability distributions outputted by a neural network corresponding to a sequence of observations inputted to the neural network.

In some embodiments, the input interface 1001 includes a network interface controller (NIC) 1005 configured to obtain the multiple sequences of observations 1009 and the multiple training sequences of labels 1025, via network 1007, which can be one or a combination of a wired and a wireless network.

The network interface controller (NIC) 1005 is adapted to connect the system 1000 through a bus 1023 to the network 1007 connecting the system 1000 with sensing devices, for example, input device 1003. Additionally or alternatively, system 1000 can include a human-machine interface (HMI) 1011. The human-machine interface 1011 within the system 1000 connects the system 1000 to a keyboard 1013 and pointing device 1015, wherein the pointing device 1015 can include a mouse, trackball, touchpad, joystick, pointing stick, stylus, or touchscreen, among others.

The system 1000 includes a processor 1021 configured to execute stored instructions 1017, as well as a memory 1019 that stores instructions that are executable by the processor 1021. The processor 1021 can be a single core processor, a multi-core processor, a computing cluster, or any number of other configurations. The memory 1019 can include random access memory (RAM), read-only memory (ROM), flash memory, or any other suitable memory systems. The processor 1021 can be connected through the bus 1023 to one or more input and output devices.

Instructions 1017 can implement a method for training a neural network associated with the system 1000 using the GTC objective function 105. System 100 may be used to implement various applications of the neural network such as end-to-end speech recognition, acoustic event detection, image recognition, and the likes, according to some embodiments. To that end, the computer memory 1019 stores the directed graph 107, a language model 1027, and the GTC objective function 105. In order to train the system 1000 using the GTC objective function 105, initially, the directed graph 107 is generated based on the obtained multiple training sequences of labels 1025. The directed graph 107 comprises multiple nodes connected with edges, where each node or edge represents a label and each node is directed towards one or more nodes in the directed graph 107.

Further, a path through a sequence of nodes and edges of the directed graph 107 representing a training sequence of labels is generated, where there are multiple paths, corresponding to the multiple training sequences of labels 1025, through the directed graph 107.

In some embodiments, the directed graph 107 is a weighted graph of the nodes weighted with associated scores corresponding to probabilities of a transcription output of a node being a true transcription output at an instance of time. In some embodiments, a transition from one node to another is weighted, where the weights may be estimated from scores of a strong language model (LM) 1027. The directed graph 107 is used by the GTC objective function 105, where the GTC objective function 105 is used to train the system 1000 to transform each sequence of observations of the multiple sequences of observations 1009 into a sequence of probability distributions over all possible labels at each instance of time by maximizing a probability of a sequence of labels, at the output of the system 1000, corresponding to a sequence of nodes and edges that are comprised by the directed graph 107, where the system 1000 comprises an output interface 1035 configured to output the sequence of probability distribution.

In some embodiments, the output interface 1039 may output each probability of the sequence of probability distribution corresponding to each label at each time stamp on a display device 1033. The sequence of probability distribution may be displayed as a matrix illustrated in FIG. 1B. Examples of a display device 1033 include a computer monitor, television, projector, or mobile device, among others. The system 1000 can also be connected to an application interface 1029 adapted to connect the system 1000 to an external device 1031 for performing various tasks such as sound event detection.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other units suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, or any other kind of central processing unit. Generally, a central processing unit will receive instructions and data from a read-only memory or a random access memory, or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A computer-implemented method for training a neural network for speech processing using a graph based temporal classification (GTC) objective function, wherein the neural network is pre-trained to output a first sequence of probability distributions corresponding to a first sequence of input speech observations, the method comprising:
   executing the pre-trained neural network to transform a second sequence of speech observations into a second sequence of probability distributions over all labels in a set of first labels;
   unfolding a directed graph to a length of the second sequence of probability distributions for generating a plurality of sequences of labels,
      wherein the directed graph comprises a plurality of nodes connected by a plurality of edges, wherein each node of the plurality of nodes represents a label of a set of second labels and the edges represent transitions among the labels of the set of second labels,
      wherein a structure of the directed graph specifies a non-monotonic alignment between the set of second labels and the second sequence of probability distributions and a constraint on label repetitions in the set of second labels, and
      wherein the unfolded directed graph represents possible alignment paths for the second sequence of probability distributions and the labels in the set of second labels such that each unfolded sequence of nodes and edges is mapped to a sequence of labels of the set of second labels; and
   updating parameters of the neural network based on the GTC objective function that is configured to maximize a sum of conditional probabilities of all possible sequences of labels in the plurality of sequences of labels, wherein the sum of the conditional probabilities of all sequences of labels is estimated from the second sequence of probability distributions.

2. The method of claim 1, wherein possible passes through the structure of the directed graph allows multiple unique label sequences, wherein the possible alignment paths for the second sequence of probability distributions and the labels in the set of second labels are obtained after collapsing label repetitions and removing blank labels from the multiple unique label sequences.

3. The method of claim 2, wherein the non-monotonic alignment is encoded in the structure of the directed graph by one or both of allowing transitions from one label to multiple other non-blank labels, or allowing transitions from one label to multiple other blank labels.

4. The method of claim 1, wherein the structure of the directed graph specifies the constraint on label repetitions by replacing a self-transition to a node representing a label with a sequence of connected nodes representing the same label.

5. The method of claim 1, wherein the unfolding of the directed graph comprises generating different sequences of labels and alignment paths according to the structure of the directed graph such that the length of each of the generated sequence of labels matches the length of the second sequence of probability distributions.

6. The method of claim 1, wherein the training with the GTC objective function defines a loss function based on the conditional probabilities, and wherein the training with the GTC objective function updates the parameters of the neural network using gradient descent training to reduce the GTC loss.

7. The method of claim 6, wherein the GTC objective function marginalizes over all possible sequences of the nodes and edges through the unfolded directed graph defining all valid label alignment paths and all valid temporal alignment paths in the directed graph to optimize outputs of the neural network with respect to such supervision information.

8. The method of claim 1, wherein the directed graph is a weighted graph with at least some edges associated with different weights, and wherein the training computes the conditional probabilities of the sequence of nodes using the weights of the corresponding edges in the directed graph and the probability distributions estimated by the neural network.

9. The method of claim 8,
   wherein the directed graph is the weighted directed graph with edges connecting the nodes associated with a numerical value corresponding to probabilities of a transcription output of a node being a true transcription output at an instance of time,
   wherein the GTC objective function is configured to learn a temporal alignment and a label alignment to obtain an optimal sequence of labels allowed by the weighted directed graph; and
   wherein the training of the neural network using the GTC objective function updates the neural network to reduce a loss with respect to the supervisory information of a graph format and an associated training sample.

10. The method of claim 9, wherein the GTC objective function is differentiated with respect to outputs of the neural network for gradient descent training.

11. The method of claim 1, further comprising:
   receiving multiple sequences of labels;
   constructing a confusion network based on the multiple sequences of labels, wherein the confusion network comprises a plurality of nodes connected with each other via a plurality of arcs, and wherein each arc of the plurality of arcs corresponds to either an arc with a label or an arc with no label;

optimizing the constructed confusion network to produce an optimized confusion network; and
generating the directed graph from the optimized confusion network.

12. The method of claim 11, wherein for constructing the confusion network the method further comprises aligning the multiple sequences of labels with each other using dynamic programming method, and wherein the dynamic programming method minimizes edit distances between the multiple label sequences.

13. The method of claim 11, wherein for generating the directed graph from the optimized confusion network, the method further comprises:
creating a starting node and an ending node;
replacing each node in the confusion network with a blank node and each arc of the plurality of nodes with a non-blank node;
creating an edge between every pair of non-blank nodes;
creating an edge between every pair of the blank node and the non-blank node;
creating edges from the starting node to the first blank nodes and the first non-blank nodes; and
creating edges to the ending node from the last blank nodes and the last non-blank nodes.

14. The method of claim 1, further comprising:
accepting an unlabeled training set including data indicative of unlabeled speech utterances;
decoding the unlabeled training set using the neural network or a seed neural network pre-trained on labeled speech utterances to produce a list of hypotheses for labeling each of the unlabeled speech utterances;
generating the directed graph from the list of hypotheses of each speech utterance; and
training the neural network using the unlabeled speech utterances and the directed graph.

15. The method of claim 1, further comprising:
accepting a training set including data indicative of weak labels;
decoding the training set using a neural network pre-trained with strong labels to produce multiple possible sequences of the weak labels;
generating the directed graph for the multiple possible sequences of the weak labels; and
training the neural network using the directed graph.

16. The method of claim 1, wherein the set of second labels represents one or more of phonemes, subword units, or characters.

17. A system for training a neural network for speech processing using a graph-based temporal classification (GTC) objective function, wherein the neural network is pre-trained to output a first sequence of probability distributions corresponding to a first sequence of input speech observations, the system comprising at least one processor; and memory having instructions stored thereon that, when executed by the at least one processor, cause the system to:
execute the pre-trained neural network to transform a second sequence of speech observations into a second sequence of probability distributions over all labels in a set of first labels;
unfold a directed graph to a length of the second sequence of probability distributions to generate a plurality of sequences of labels,
wherein the directed graph comprises a plurality of nodes connected by a plurality of edges, wherein each node of the plurality of nodes represents a label of a set of second labels and the edges represent transitions among the labels of the set of second labels,
wherein a structure of the directed graph specifies a non-monotonic alignment between the set of second labels and the second sequence of probability distributions and a constraint on label repetitions in the set of second labels, and
wherein the unfolded directed graph represents possible alignment paths for the second sequence of probability distributions and the labels in the set of second labels such that each unfolded sequence of nodes and edges is mapped to a sequence of labels of the set of second labels; and
update parameters of the neural network based on the GTC objective function that is configured to maximize a sum of conditional probabilities of all possible sequences of labels in the plurality of sequences of labels, wherein the sum of the conditional probabilities of all sequences of labels is estimated from the second sequence of probability distributions.

18. The system of claim 17, wherein possible passes through the structure of the directed graph allows multiple unique label sequences, wherein the possible alignment paths for the second sequence of probability distributions and the labels in the set of second labels are obtained after collapsing label repetitions and removing blank labels from the multiple unique label sequences.

19. The system of claim 17, wherein the structure of the directed graph specifies the constraint on label repetitions by replacing a self-transition to a node representing a label with a sequence of connected nodes representing the same label.

20. A non-transitory computer readable storage medium embodied thereon a program executable by a processor for performing a method for training a neural network for speech processing using a graph-based temporal classification (GTC) objective function, wherein the neural network is pre-trained to output a first sequence of probability distributions corresponding to a first sequence of input speech observations, the method comprising:
executing the pre-trained neural network to transform a second sequence of speech observations into a second sequence of probability distributions over all labels in a set of first labels;
unfolding a directed graph to a length of the second sequence of probability distributions for generating a plurality of sequences of labels,
wherein the directed graph comprises a plurality of nodes connected by a plurality of edges, wherein each node of the plurality of nodes represents a label of a set of second labels and the edges represent transitions among the labels of the set of second labels,
wherein a structure of the directed graph specifies a non-monotonic alignment between the set of second labels and the second sequence of probability distributions and a constraint on label repetitions in the set of second labels, and
wherein the unfolded directed graph represents possible alignment paths for the second sequence of probability distributions and the labels in the set of second labels such that each unfolded sequence of nodes and edges is mapped to a sequence of labels of the set of second labels; and
updating parameters of the neural network based on the GTC objective function that is configured to maximize a sum of conditional probabilities of all possible sequences of labels in the plurality of sequences of labels, wherein the sum of the conditional probabilities of all sequences of labels is estimated from the second sequence of probability distributions.

* * * * *